United States Patent
Ono et al.

(10) Patent No.: US 7,493,984 B2
(45) Date of Patent: Feb. 24, 2009

(54) STEERING CONTROL APPARATUS AND METHOD FOR DIAGNOSING CABLE ATTACHMENT

(75) Inventors: Hitoshi Ono, Kanagawa (JP); Takahiro Maekawa, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 380 days.

(21) Appl. No.: 11/288,443

(22) Filed: Nov. 29, 2005

(65) Prior Publication Data
US 2006/0131096 A1 Jun. 22, 2006

(30) Foreign Application Priority Data
Nov. 29, 2004 (JP) ............................. 2004-343266
Sep. 21, 2005 (JP) ............................. 2005-273101

(51) Int. Cl.
*B62D 5/04* (2006.01)
(52) U.S. Cl. ..................... 180/404; 180/446; 324/503
(58) Field of Classification Search ................. 180/443, 180/444, 446; 324/503
See application file for complete search history.

(56) References Cited
U.S. PATENT DOCUMENTS
5,596,138 A * 1/1997 Onodera et al. ............. 73/49.2
6,851,325 B2 * 2/2005 Mir et al. ............... 73/862.335
7,322,898 B2 * 1/2008 Augustine et al. ............. 475/19

FOREIGN PATENT DOCUMENTS
JP 2003-324836 A 11/2003
JP 2004-058745 A 2/2004

* cited by examiner

*Primary Examiner*—Kevin Hurley
(74) *Attorney, Agent, or Firm*—Foley & Lardner LLP

(57) ABSTRACT

A steering control apparatus for a vehicle including a steering input unit movable to set a steering input, and a steering output unit arranged to output a steering output, the steering input unit being connected via a cable to a body of the vehicle, includes a steering ratio control unit, a steering limiter, and a cable-attachment diagnostic controller. The steering ratio control unit regulates a variable steering ratio as a rate of change in the steering output with respect to a change in the steering input. The steering limiter restricts movement of the steering input unit to limit the steering input. The cable-attachment diagnostic controller is activated in a cable-attachment diagnostic mode, to control the steering ratio in such a manner that the steering input unit is movable over an allowable region defined by the steering limiter when the cable is correctly attached.

20 Claims, 29 Drawing Sheets

FIG.30

| MAXIMUM MOTOR ROTATION FROM A TO B (°) | UPPER LIMIT FOR OPERATOR'S STEERING SPEED (°/SECOND) | MINIMUM OVERALL OPERAITON TIME (SECOND) |
|---|---|---|
| 80 | 500 | 5.2 |
| 100 | 400 | 6.5 |
| 150 | 266 | 9.8 |
| 200 | 200 | 13 |
| 250 | 160 | 16.3 |

STEERING CONTROL APPARATUS AND METHOD FOR DIAGNOSING CABLE ATTACHMENT

BACKGROUND OF THE INVENTION

The present invention relates generally to a steering system with a variable steering ratio, and more particularly to a steering control apparatus and method for diagnosing cable attachment in a steering system with a variable steering ratio.

Conventionally, there is known a steering system for vehicle, which includes a steering shaft equipped with a spiral cable, such as a spiral cable for airbag. Such a spiral cable has one end fastened to a vehicle body, and the other end fastened to a steering shaft, being wound around the steering shaft with a margin. After attachment of this spiral cable, a steering wheel connected to the steering shaft is turned lock to lock (specifically, turned rightward until the steering wheel is locked or restricted, and then turned leftward until the steering wheel is locked), in order to check whether the spiral cable is correctly attached with a margin for right-and-left rotation of the steering wheel. Since a typical steering system includes no member to directly restrict movement of the steering shaft, the state of lock is defined in case of a rack-and-pinion steering mechanism by a condition that a contact portion of a rack shaft is mechanically restricted by a stopper to the vehicle body, or is in contact with the stopper. Even when the check of cable attachment is inadequate, for example, when there is no margin for rightward rotation of the steering wheel, the spiral cable for airbag is easily ruptured by a driver's force of operating the steering wheel. Thus, in the above-mentioned steering system, no undesirable steering lock occurs during the vehicle driving.

A Published Japanese Patent Application No. 2003-324836 (referred to as "JP2003-324836") shows a spiral cable device for a variable steering ratio steering system for an automotive vehicle. The spiral cable device shown in JP2003-324836 includes a cylindrical housing, an inner cylinder provided so as to relatively rotatable with respect to the housing, and a flexible flat cable having one end connected to the inner cylinder, and having the other end connected to the hosing. The variable steering ratio steering system shown in JP2003-324836 includes an electric motor as an actuator for regulating its steering ratio, so as to variably control the steer angle of a steered road wheel with respect to the steering shaft angle. The stator of the electric motor is fixed to the steering shaft, and connected electrically to electrical equipment mounted in the vehicle body via the flexible flat cable as in the case of the spiral cable for airbag. Even when the stator rotates with rotation of the steering shaft, the spiral cable allows transmission of electric power and signals.

SUMMARY OF THE INVENTION

If the cable-attachment diagnostic operation based on lock-to-lock steering as in the case of the spiral cable for airbag is applied to the spiral cable for the variable steering ratio steering system shown in JP2003-324836, there are the following potential problems. In general, a variable steering ratio control mechanism is configured to control a steering ratio such a manner as to increase the displacement of a rack shaft with respect to a steering wheel angle with a decrease in the vehicle speed, in case of a rack-and-pinion steering mechanism. Accordingly, in case the cable-attachment diagnostic operation based on lock-to-lock steering is performed when the vehicle is at rest with the variable steering ratio steering system being shut down, the steering wheel angle defined by the rack stopper is not identical to that with the variable steering ratio steering system being active. Therefore, it is possible that the cable-attachment diagnostic operation incorrectly checks whether the spiral cable is correctly attached with a margin for right-and-left rotation of the steering wheel. Similarly, it is possible that the cable-attachment diagnostic operation incorrectly checks whether the spiral cable for airbag is correctly attached. On the other hand, the power supply line to the electric motor of a typical variable steering ratio control mechanism is formed of a cable thick enough to supply an adequate amount of electric current for operating the electric motor. Accordingly, the cable is not easily ruptured. Therefore, if the check of cable attachment is unsatisfactory, it is possible that movement of the steering wheel is restricted by the spiral cable before the rack shaft reaches the rack stopper.

Accordingly, it is an object of the present invention to reliably check cable attachment in a steering system with a variable steering ratio.

According to one aspect of the present invention, a steering control apparatus for a vehicle including a steering input unit movable to set a steering input, and a steering output unit arranged to output a steering output, the steering input unit being connected via a cable to a body of the vehicle, comprises: a steering ratio control unit configured to regulate a variable steering ratio as a rate of change in the steering output with respect to a change in the steering input; a steering limiter configured to restrict movement of the steering input unit to limit the steering input; and a cable-attachment diagnostic controller configured to be activated in a cable-attachment diagnostic mode, to control the steering ratio in such a manner that the steering input unit is movable over an allowable region defined by the steering limiter when the cable is correctly attached. The steering control apparatus may be configured wherein the steering input unit includes a steering wheel, and a steering shaft coupled to the steering wheel, wherein the steering output unit includes a steerable road wheel, a pinion shaft, a steering gear mechanism connected between the steerable road wheel and the pinion shaft for motion conversion therebetween, wherein the steering ratio control unit is configured to regulate a variable shaft steering ratio as a rate of change in a rotation angle of the pinion shaft with respect to a change in a rotation angle of the steering shaft, and wherein the cable-attachment diagnostic controller is configured to control the shaft steering ratio to be lower than 1. The steering control apparatus may be configured wherein the cable-attachment diagnostic controller is configured to move the steering input unit over the allowable region.

According to another aspect of the invention, a steering control apparatus for a vehicle including a steering input unit movable to set a steering input, and a steering output unit arranged to output a steering output, the steering input unit being connected via a cable to a body of the vehicle, comprises: steering ratio control means for regulating a variable steering ratio as a rate of change in the steering output with respect to a change in the steering input; steering limiting means for restricting movement of the steering input unit to limit the steering input; and cable-attachment diagnostic control means for being activated in a cable-attachment diagnostic mode, to control the steering ratio in such a manner that the steering input unit is movable over an allowable region defined by the steering limiting means when the cable is correctly attached.

According to a further aspect of the invention, a method of diagnosing a vehicle including a steering input unit movable to set a steering input, and a steering output unit arranged to output a steering output, the steering input unit being connected via a cable to a body of the vehicle, the steering control apparatus including: a steering ratio control unit configured to regulate a variable steering ratio as a rate of change in the steering output with respect to a change in the steering input; and a steering limiter configured to restrict movement of the steering input unit to limit the steering input, comprises: controlling the steering ratio in such a manner that the steering input unit is movable over an allowable region defined by the steering limiter when the cable is correctly attached. The method may further comprise: moving the steering input unit in a first direction; determining that the cable is correctly attached in the first direction when the steering input unit moves in the first direction to be restricted by the steering limiter; determining that the cable is incorrectly attached when the steering input unit does not move in the first direction to be restricted by the steering limiter; moving the steering input unit in a second direction different from the first direction when it is determined that the cable is correctly attached in the first direction; determining that the cable is correctly attached in the second direction when the steering input unit moves in the second direction to be restricted by the steering limiter; determining that the cable is incorrectly attached when the steering input unit does not move in the second direction to be restricted by the steering limiter; and performing a repair operation when it is determined that the cable is incorrectly attached. The method may further comprise: neutralizing and holding stationary the steering output unit before moving the steering input unit; and neutralizing the steering input unit when it is determined that the cable is correctly attached in the second direction.

BRIEF DESCRIPTION OF THE DRAWINGS

FIG. 30 is a view showing a relationship among a maximum motor rotation from A to B, an upper limit for operator's steering speed, and a minimum overall operation time.

DETAILED DESCRIPTION OF THE INVENTION

Figure 1:
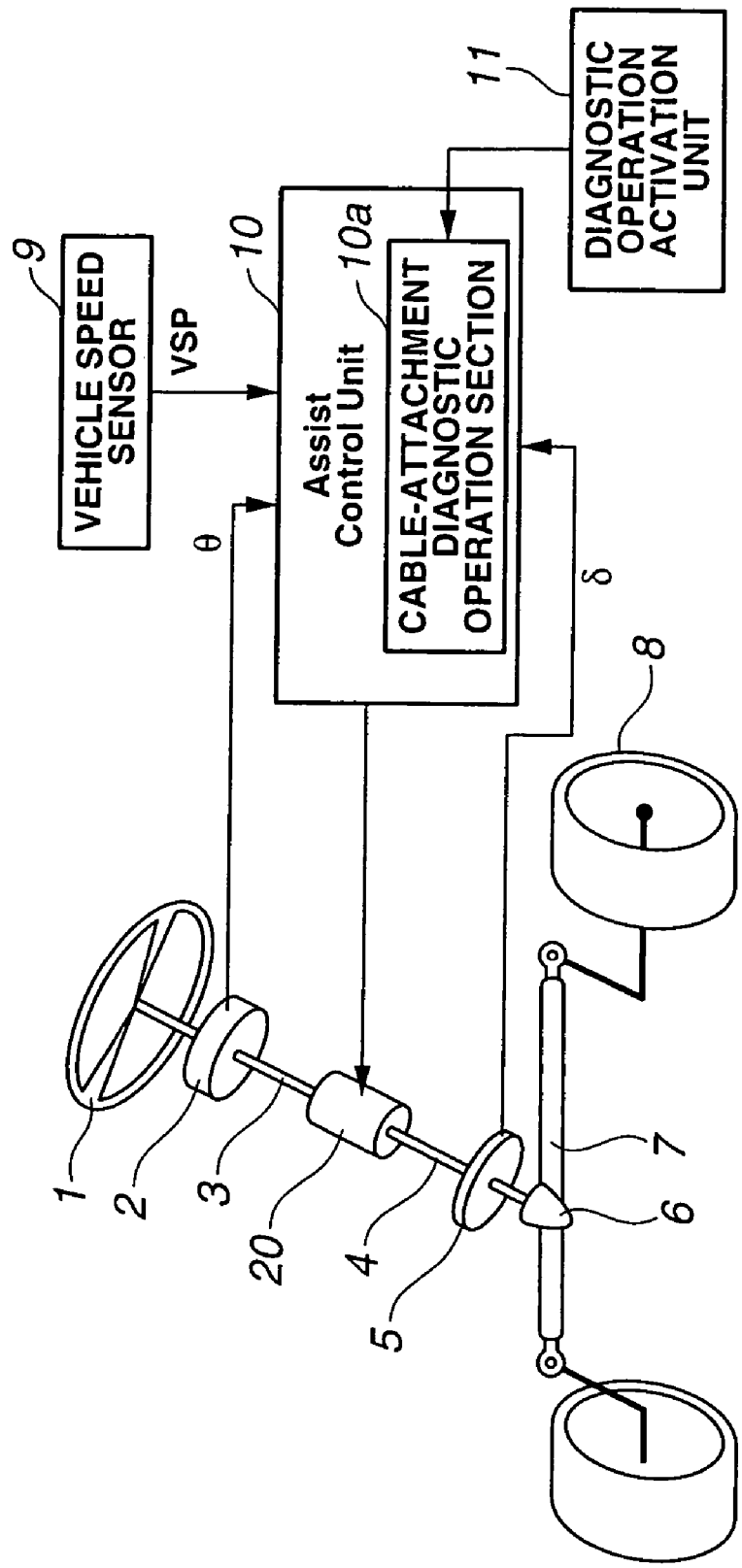
FIG. 1 is a schematic diagram showing a vehicle steering system with a steering control apparatus in accordance with a first embodiment.

Referring now to FIGS. 1 through 7, there is shown a steering control apparatus in accordance with a first embodiment. FIG. 1 is a schematic diagram showing a vehicle steering system with a steering control apparatus in accordance the first embodiment. As shown in FIG. 1, a steering wheel 1 is connected to a steering shaft 3. A steering shaft angle sensor 2 is mounted to steering shaft 3 and configured to measure a steering wheel angle as an angular position of steering wheel 1 or an angular position of steering shaft 3. Steering shaft 3 has a lower end portion connected to an upper part of a variable steering ratio control mechanism 20 as a variable steering ratio control unit configured to regulate a variable steering ratio defined as a rate of change in the steering output with respect to a change in the steering input. A lower part of variable steering ratio control mechanism 20 is connected to an upper end portion of a pinion shaft 4. A pinion shaft angle sensor 5 is mounted to pinion shaft 4 and configured to measure a pinion shaft angle as an angular position of pinion shaft 4. Pinion shaft 4 has a lower end portion coupled to a pinion 6 adapted to be engaged with teeth formed in a rack shaft 7, so as to construct a rack-and-pinion mechanism. A vehicle speed sensor 9 is provided to measure a longitudinal speed VSP of the vehicle. When steering wheel 1 is operated by a driver, rotation of steering shaft 3 is transmitted to variable steering ratio control mechanism 20. Variable steering ratio control mechanism 20 is configured to rotate pinion shaft 4, and thereby to rotate pinion 6. Rotation of pinion 6 is converted into a straight movement along the axial direction of rack shaft 7, to steer steerable wheels 8. Steering wheel 1 and steering shaft 3 serve as a steering input unit movable to set a steering input. Pinion shaft 4, pinion 6, rack shaft 7, and steerable wheel 8 serve as a steering output unit arranged to output a steering output.

An assist control unit 10 is provided and configured to receive sensor signals from sensors, namely, a signal indicative of steering shaft angle θ (steering wheel angle) from steering shaft angle sensor 2, a signal indicative of pinion shaft angle δ from pinion shaft angle sensor 5, and a signal indicative of vehicle speed VSP from vehicle speed sensor 9. Assistant control unit 10 is configured to compute a desired steering ratio $\Delta\delta/\Delta\theta$ as a rate of change in pinion shaft angle δ with respect to change in steering shaft angle θ, based on the sensor signal values, and to output a control command to variable steering ratio control mechanism 20. Alternatively, without pinion shaft angle sensor 5, pinion shaft angle δ may be measured by computation in accordance with steering shaft angle θ and the angular position of the motor of variable steering ratio control mechanism 20 measured by a motor rotation angle sensor carried in the motor. Thus, in the present embodiments, the rate of change in pinion shaft angle δ with respect to change in steering shaft angle θ is referred to simply as steering ratio $\Delta\delta/\Delta\theta$, or as shaft steering ratio $\Delta\delta/\Delta\theta$ as distinguished from overall steering ratio between the steering wheel angle of steering wheel 1 and the road wheel steer angle of steerable wheel 8.

Assistant control unit 10 includes a cable-attachment diagnostic operation section 10a as a cable-attachment diagnostic controller to diagnose or inspect attachment of spiral cable, or to detect incorrect attachment of spiral cable. A diagnostic operation activation unit 11 is provided and configured to be responsive to an instruction of a cable-attachment diagnostic mode, and to output a signal to activate cable-attachment diagnostic operation section 10a. When the activation signal is input to cable-attachment diagnostic operation section 10a from diagnostic operation activation unit 11, cable-attachment diagnostic operation section 10a is activated in a cable-attachment diagnostic mode, to perform a cable-attachment diagnostic operation. As mentioned below, a special steering ratio control is performed in the cable-attachment diagnostic operation. Diagnostic operation activation unit 11 may be implemented by an external inspection terminal provided in an assembly plant and configured to output a signal to assistant control unit 10. Alternatively, diagnostic operation activation unit 11 may be implemented by a combination switch provided in the interior room of the vehicle, and configured to output a signal to assist control unit 10.

Figure 2:
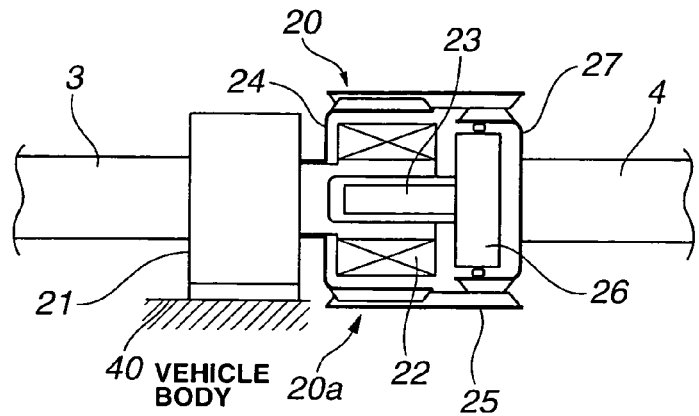
FIG. 2 is a schematic diagram showing a detailed structure of a variable steering ratio control mechanism 20 of FIG. 1.
Figure 3:
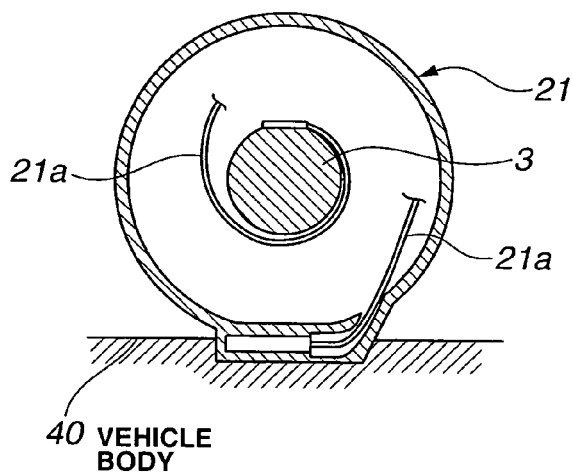
FIG. 3 is a schematic cross-sectional view of a spiral cable unit 21 of FIG. 2.

FIG. 2 is a schematic diagram showing a detailed structure of variable steering ratio control mechanism 20. FIG. 3 is a schematic cross-sectional view of a spiral cable unit 21. As shown in FIG. 3, spiral cable unit 21 accommodates a spiral cable 21a. Spiral cable 21a has one end fastened to a body 40 of the vehicle, and the other end fastened to steering shaft 3, being loosely wound around steering shaft 3 with a margin for rotation of steering shaft 3. As shown in FIG. 2, steering shaft 3 is coupled rigidly to an external gear 24, and a stator 22 as a part of an electric motor 20a as an electric actuator. The end of spiral cable 21a to steering shaft 3 is particularly fastened to stator 22, so as to constantly supply an electric power or a signal to stator 22 independently of rotation of steering shaft 3. Radially inside stator 22 is formed a rotor 23 as a part of electric motor 20a, to drive a wave generator 26. Wave generator 26 includes an ellipse-shaped cam adapted to be changed in the spatial relationship between its major axis and its minor axis. Radially outside wave generator 26 is formed a flexspline 27 having an external tooth portion formed of a metal elastic body. Flexspline 27 is in contact with wave generator 26 via a bearing. Flexspline 27 is coupled rigidly to pinion shaft 4. A circular spline 25 has an inner tooth portion whose number of teeth is same as that of external gear 24. Circular spline 25 is engaged with external gear 24, and is also engaged with flexspline 27. Thus, rotation of external gear 24 is transmitted to flexspline 27. The number of teeth of the tooth portion of flexspline 27 is larger by two than that of external gear 24. The major-axis portion of flexspline 27 is engaged with circular spline 25, but the minor-axis portion of flexspline 27 is disengaged with circular spline 25. When rotor 23 rotates one time, wave generator 26 generates elastic deformation of flexspline 27, to change the spatial relationship between its major axis and its minor axis, to speed up or down by rotation of two teeth, establishing called a harmonic drive mechanism. Variable steering ratio control mechanism 20 also includes a locking mechanism (not shown) for holding rotor 23 and stator 22 to each other to set the steering ratio to 1 during system-failure conditions or during the ignition switch being OFF. The detailed construction of variable steering ratio control mechanism 20 is described in Published Japanese Patent Applications Nos. 2004-58745, and 2003-324836.

Figure 4:
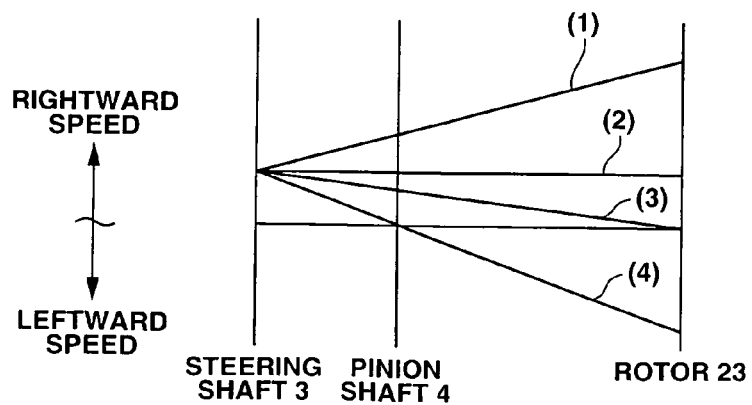
FIG. 4 is a common speed diagram showing a relationship in rotational speed among a steering shaft, a pinion shaft, and a rotor in variable steering ratio control mechanism 20 of FIG. 1.

FIG. 4 is a common speed diagram or lever diagram showing a relationship in rotational speed among steering shaft 3, pinion shaft 4, and rotor 23. In FIG. 4, the upper region above the horizontal axis indicates a rightward rotational speed, and the lower region indicates a leftward rotational speed. The vertical position with respect to the horizontal axis indicates the magnitude of the rotational speed. It is noted that the rotational speed of rotor 23 is measured with respect to the vehicle body, not with respect to stator 22 which rotates rigidly with steering shaft 3. Although the following describes four patterns (1) through (4) of the case where steering wheel 1 (steering shaft 3) is turned rightward, the case where steering wheel 1 is turned leftward is exactly alike. Pattern (1) shown in FIG. 4 indicates a situation where assist control unit 10 controls steering ratio $\Delta\delta/\Delta\theta$ to be higher than 1 when steering shaft 3 is turned rightward. In this situation, the rotational speed of rotor 23 is controlled to be higher than that of steering shaft 3, to speed up the rotational speed of pinion shaft 4 with respect to that of steering shaft 3. Pattern (2) shown in FIG. 4 indicates a situation where assist control unit 10 controls steering ratio $\Delta\delta/\Delta\theta$ to be equal to 1 when steering shaft 3 is turned rightward. In this situation, the rotational speed of rotor 23 is controlled to be equal to that of steering shaft 3, to hold the rotational speed of pinion shaft 4 to that of steering shaft 3. Pattern (3) shown in FIG. 4 indicates a situation where assist control unit 10 controls steering ratio $\Delta\delta/\Delta\theta$ to be lower than 1 when steering shaft 3 is turned rightward. In this situation, the rotational speed of rotor 23 is controlled to be lower than that of steering shaft 3, to speed down the rotational speed of pinion shaft 4 with respect to that of steering shaft 3. Pattern (4) shown in FIG. 4 indicates a situation where pinion shaft 4 is held stationary and the rotational speed of rotor 23 is controlled to be a leftward speed. In this situation, steering shaft 3 rotates rightward. Thus, with pinion shaft 4 being held stationary, the direction of rotation of steering shaft 3 is reversed with respect to that of rotor 23.

Figure 5:
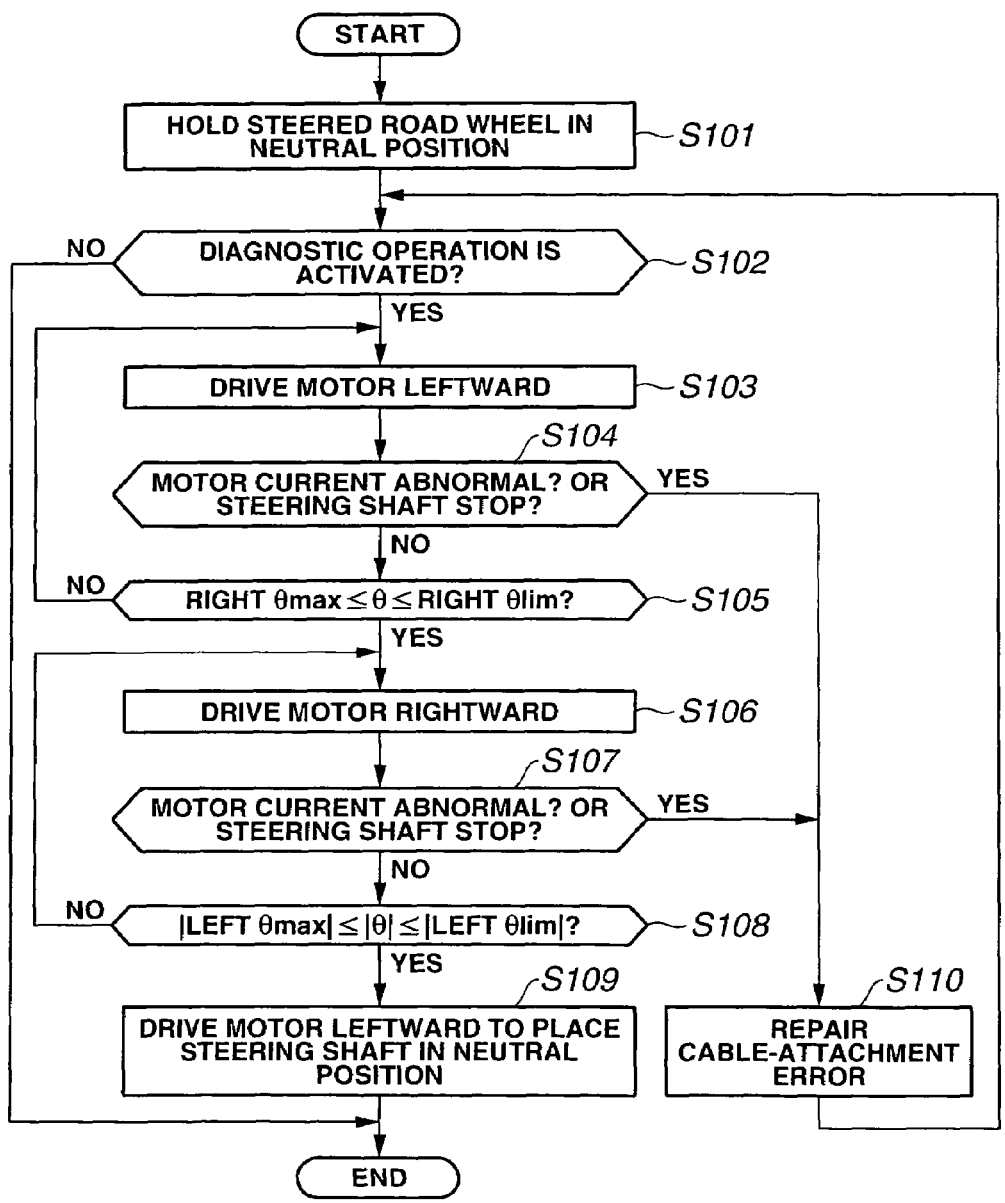
FIG. 5 is a flow chart showing a cable-attachment diagnostic operation to be performed by a cable-attachment diagnostic operation section 10a of FIG. 1.

The following describes a cable-attachment diagnostic operation for spiral cable 21a to be performed by cable-attachment diagnostic operation section 10a in accordance with the first embodiment. The cable-attachment diagnostic operation is basically performed in an assembly plant for automotive vehicles, or in a repair shop, etc. Before performing the cable-attachment diagnostic operation, variable steering ratio control mechanism 20 and steering shaft angle sensor 2 are installed to the vehicle, and the sensors are initialized. The locking mechanism of variable steering ratio control mechanism 20 is inactivated. FIG. 5 is a flow chart showing the cable-attachment diagnostic operation to be performed by cable-attachment diagnostic operation section 10a.

At step S101, cable-attachment diagnostic operation section 10a neutralizes steerable wheel 8 and holds steerable wheel 8 stationary in its neutral position.

Subsequent to step S101, at step S102, cable-attachment diagnostic operation section 10a determines whether or not to perform the cable-attachment diagnostic operation, by checking the activation signal from diagnostic operation activation unit 11. When the answer to step S102 is affirmative (YES), the routine proceeds to step S103. On the other hand, when the answer to step S102 is negative (NO), the routine returns.

At step S103, cable-attachment diagnostic operation section 10a operates or drives electric motor 20a leftward, to rotate steering shaft 3 (steering wheel 1) rightward. That translates to that steering ratio $\Delta\delta/\Delta\theta$ is controlled to be zero, since pinion shaft 4 is held stationary in this operation ($\delta$, $\Delta\delta \approx 0$).

Subsequent to step S103, at step S104, cable-attachment diagnostic operation section 10a determines whether or not at least one of the following first and second conditions are satisfied. The first condition is that there is abnormality in electric current to electric motor 20a due to an excessive or rapid increase in the load of electric motor 20a. The second condition is that rotation of steering shaft 3 is restricted. The second condition is checked based on the detected value from steering shaft angle sensor 2. When the answer to step S104 is YES, the routine proceeds to step S110. On the other hand, when the answer to step S104 is NO, the routine proceeds to step S105.

At step S105, cable-attachment diagnostic operation section 10a determines whether or not steering shaft angle $\theta$ measured by steering shaft angle sensor 2 is larger than or equal to a right maximum operating steering shaft angle (or usual maximum steering shaft angle or maximum angle to be verified) $\theta$max and is smaller than or equal to a maximum measurable steering shaft angle $\theta$lim of steering shaft angle sensor 2. Maximum operating steering shaft angle $\theta$max is defined as a maximum steering shaft angle when variable steering ratio control mechanism 20 regulates the steering ratio to a minimum steering ratio setting during usual vehicle driving conditions. When the answer to step S105 is YES, the routine proceeds to step S106. On the other hand, when the answer to step S105 is NO, the routine proceeds back to step S103. Thus, steps S103 through S105 are repeatedly executed until one of the condition of step S104 and the condition of step S105 is satisfied.

At step S106, cable-attachment diagnostic operation section 10a drives electric motor 20a rightward, to rotate steering shaft 3 (steering wheel 1) leftward. That translates to that steering ratio $\Delta\delta/\Delta\theta$ is controlled to be zero, since pinion shaft 4 is held stationary in this operation ($\delta$, $\Delta\delta \approx 0$).

Subsequent to step S106, at step S107, cable-attachment diagnostic operation section 10a determines whether or not at least one of the following first and second conditions are satisfied. The first condition is that there is abnormality in electric current to electric motor 20a due to an excessive or rapid increase in the load of electric motor 20a. The second condition is that rotation of steering shaft 3 is restricted. The second condition is checked based on the detected value from steering shaft angle sensor 2. When the answer to step S107 is YES, the routine proceeds to step S110. On the other hand, when the answer to step S107 is NO, the routine proceeds to step S108.

At step S108, cable-attachment diagnostic operation section 10a determines whether or not steering shaft angle $\theta$ measured by steering shaft angle sensor 2 is larger than or equal to a left maximum operating steering shaft angle $\theta$max and is smaller than or equal to a maximum measurable steering shaft angle $\theta$lim of steering shaft angle sensor 2. When the answer to step S108 is YES, the routine proceeds to step S109. On the other hand, when the answer to step S108 is NO, the routine proceeds back to step S106. Thus, steps S106 through S108 are repeatedly executed until one of the condition of step S107 and the condition of step S108 is satisfied.

At step S109, cable-attachment diagnostic operation section 10a drives electric motor 20a leftward, to rotate steering shaft 3 (steering wheel 1) rightward back to its neutral position. Subsequently, the routine returns.

At step S110, a repair operation is performed to cancel the detected incorrect attachment of spiral cable 21a.

Figures 6A, 6B:
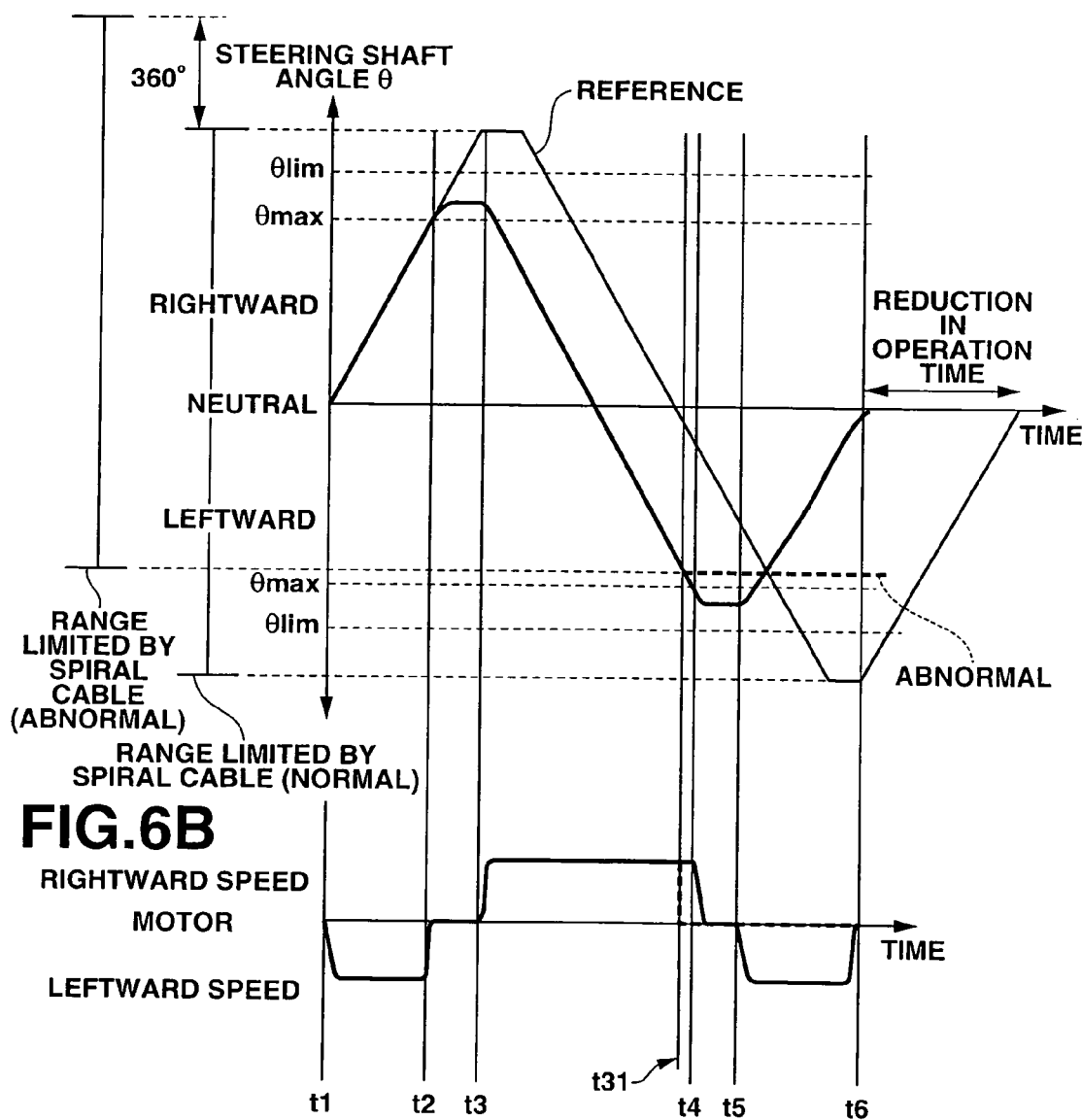
FIGS. 6A and 6B are views showing a behavior of the cable-attachment diagnostic operation over time in accordance with the first embodiment.

FIGS. 6A and 6B are views showing a behavior of the cable-attachment diagnostic operation over time in accordance with the first embodiment. In FIG. 6A, a thin solid line represents a reference example of cable-attachment diagnostic operation where steering shaft angle θ changes with time in case spiral cable 21a is attached normally. In FIGS. 6A and 6B, a thick solid line represents an example behavior of the cable-attachment diagnostic operation in accordance with the first embodiment where steering shaft angle θ changes with time in case spiral cable 21a is attached normally. In FIGS. 6A and 6B, a thick dotted line represents an example behavior of the cable-attachment diagnostic operation in accordance with the first embodiment where steering shaft angle θ changes with time in case spiral cable 21a is attached incorrectly. On the left side of FIG. 6A, the movable range of steering shaft 3 restricted or limited by spiral cable 21a is shown along the vertical direction. When steering shaft angle θ is in the movable range due to spiral cable 21a, rotation of steering shaft 3 is not interfered by spiral cable 21a. On the other hand, when steering shaft angle θ is going out of the movable range due to spiral cable 21a, rotation of steering shaft 3 is interfered or restricted or obstructed by spiral cable 21a. First in the cable-attachment diagnostic operation, steerable wheel 8 is held in its neutral position, to hold pinion shaft 4 in its neutral position.

The following describes an example behavior of the cable-attachment diagnostic operation in accordance with the first embodiment where steering shaft angle θ changes with time in case spiral cable 21a is attached normally, as indicated by the thick solid line in FIG. 6A. At time t1, cable-attachment diagnostic operation section 10a determines to perform the cable-attachment diagnostic operation, by checking the activation signal from diagnostic operation activation unit 11. Subsequently, cable-attachment diagnostic operation section 10a drives electric motor 20a leftward, to rotate steering shaft 3 (steering wheel 1) rightward. That translates to that steering ratio Δδ/Δθ is controlled to be zero, since pinion shaft 4 is held stationary in this operation (δ, Δδ≈0). At time t2, cable-attachment diagnostic operation section 10a determines that steering shaft angle θ measured by steering shaft angle sensor 2 is larger than or equal to maximum operating steering shaft angle θmax and is smaller than or equal to maximum measurable steering shaft angle θlim of steering shaft angle sensor 2. Subsequently, cable-attachment diagnostic operation section 10a stops electric motor 20a. Although the determinant condition is that steering shaft angle θ is larger than or equal to θmax and is smaller than or equal to θlim in the first embodiment, the determinant condition may be that steering shaft angle δ is equal to a predetermined threshold angle θ1 between θmax and θlim. At time t3, cable-attachment diagnostic operation section 10a drives electric motor 20a rightward, to rotate steering shaft 3 (steering wheel 1) leftward. At time t4, cable-attachment diagnostic operation section 10a determines that steering shaft angle θ measured by steering shaft angle sensor 2 is larger than or equal to maximum operating steering shaft angle θmax and is smaller than or equal to maximum measurable steering shaft angle θlim of steering shaft angle sensor 2. Subsequently, cable-attachment diagnostic operation section 10a stops electric motor 20a. At time t5, cable-attachment diagnostic operation section 10a drives electric motor 20a leftward, to rotate steering shaft 3 (steering wheel 1) rightward back to its neutral position. At time t6, steering shaft angle θ returns to its neutral position. Subsequently, the cable-attachment diagnostic operation is terminated.

The following describes an example behavior of the cable-attachment diagnostic operation in accordance with the first embodiment where spiral cable 21a is attached abnormally or incorrectly. Specifically, in this case, spiral cable 21a is attached with an error of one rightward turn (360°) of steering shaft 3, as shown in FIG. 6A. From time t1 to time t3, cable-attachment diagnostic operation section 10a performs in the same manner as in the above-mentioned normal attachment condition. At time t31, steering shaft angle θ of steering shaft 3 exceeds the movable range limited by spiral cable 21a. As a result, the rotation of electric motor 20a is held stationary by the tension of spiral cable 21a. Accordingly, with counter electromotive force being lost, the current through electric motor 20a rises. On the other hand, steering shaft angle θ is held at a fixed value, at this time. Therefore, cable-attachment diagnostic operation section 10a determines that there is an error in attachment of spiral cable 21a, and performs the repair operation.

The following describes a reference example of cable-attachment diagnostic operation, and differences between the cable-attachment diagnostic operation of the first embodiment and the reference example. In the reference example, an electric motor is driven over the whole movable range limited by a spiral cable. It is checked whether or not a steering shaft angle is larger than or equal to a predetermined value at the time when an increase in motor current due to a tension of the spiral cable is detected. In addition, it is checked whether or not the neutral position of steering is at or near the central point between both ends of the detected movable range. The above-mentioned cable-attachment diagnostic operation is performed in the reference example. Since the spiral cable is wound around the steering shaft with a certain amount of margin in the above-mentioned reference example, the steering shaft is turned over the maximum measurable steering shaft angle of a steering shaft angle sensor. As a result, the steering shaft angle sensor detects an impossible value, and thereby determines that there is a failure. Accordingly, the steering shaft angle sensor needs to be reinitialized. In general, however, initialization of a steering shaft angle sensor is performed with alignment adjustment of road wheels, after vehicle assembly. Hence, the steering shaft angle sensor needs to be reinitialized after cable-attachment diagnostic operation, in the reference example.

Figure 7:
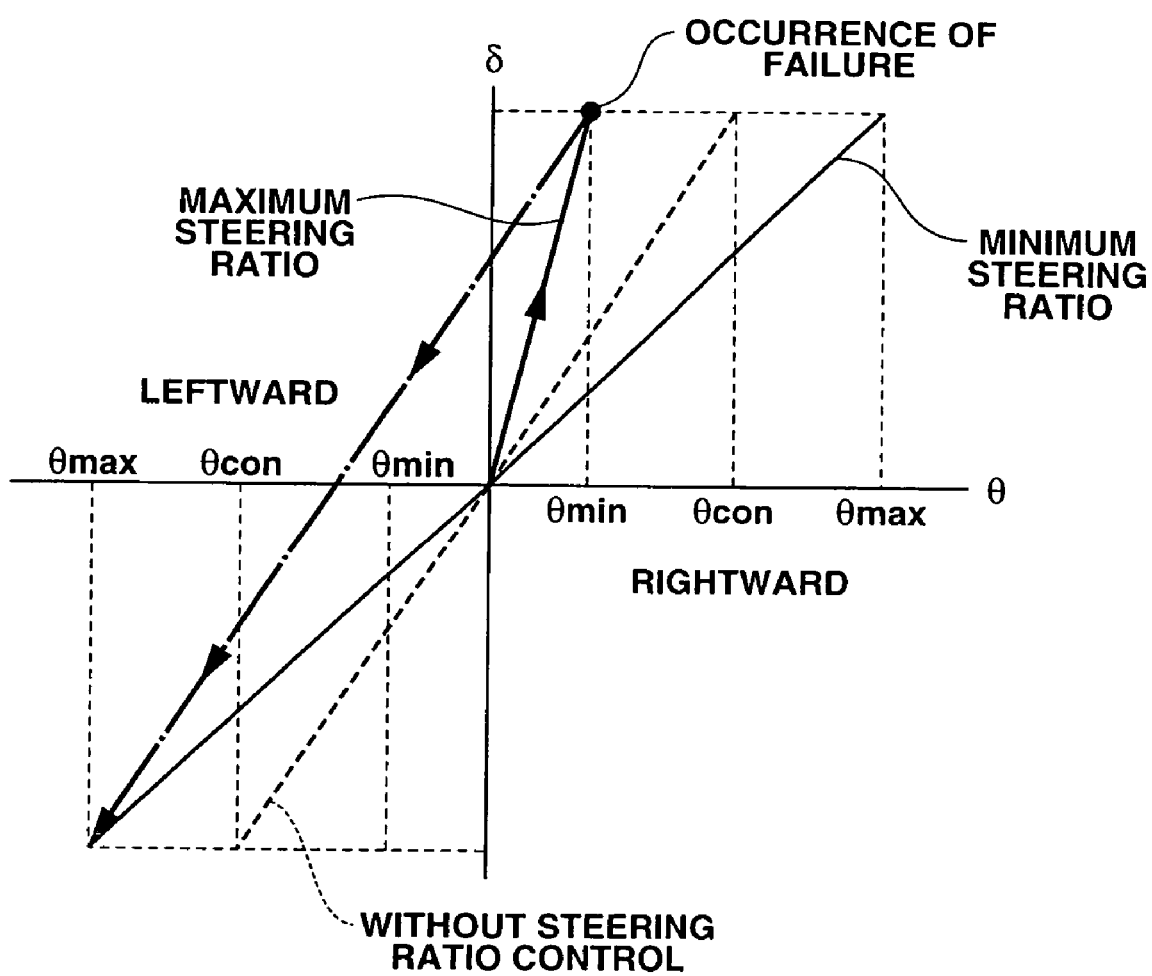
FIG. 7 is a view showing a relationship between a steering shaft angle $\theta$ of the steering shaft and a pinion shaft angle $\delta$ of the pinion shaft of FIG. 1.

FIG. 7 is a view showing a relationship between steering shaft angle θ of steering shaft 3 and pinion shaft angle δ of pinion shaft 4, in the first embodiment. In FIG. 7, θmin represents the maximum steering shaft angle under control with a maximum steering ratio setting, θcon represents the maximum steering shaft angle with no steering ratio control, and θmax is the maximum steering shaft angle under control with a minimum steering ratio setting. FIG. 7 shows a situation where a failure occurs in the steering system while variable steering ratio control mechanism 20 is performing the steering ratio control to set the steering ratio to the maximum steering ratio setting. When the control mode is switched to a conventional steering control mode in accordance with the occurrence of failure, the position of steering shaft 3 when pinion shaft angle δ is zero, that is, the neutral position is displaced by a maximum deviation. As shown in FIG. 7, when steering shaft 3 is turned leftward with the deviation of the neutral position, steering shaft angle θ reaches maximum operating steering shaft angle θmax. Therefore, in case maximum operating steering shaft angle θmax is within the movable range limited by spiral cable 21a, steering shaft 3 is allowed to rotate without interference of spiral cable 21a even during failure conditions. In the first embodiment, the above-mentioned operation is produced by placing the minimum steering ratio setting and the maximum steering ratio setting symmetrically with respect to the fixed steering ratio setting (without steering ratio control). However, when the minimum steering ratio setting and the maximum steering ratio setting are asymmetrically placed with respect to the fixed steering ratio setting, maximum operating steering shaft angle θmax is defined in another manner. For example, comparing the steering shaft angle that after a failure occurs when steering shaft 3 is turned to the maximum with the maximum steering ratio setting, steering shaft 3 is turned back to the maximum with the fixed steering ratio setting, and the steering shaft angle that steering shaft 3 is turned leftward with the minimum steering ratio setting, the larger one is defined as maximum operating steering shaft angle θmax.

In view of above-mentioned subjects, cable-attachment diagnostic operation section 10a determines that an error is present in attachment of spiral cable 21a when steering shaft angle θ measured by steering shaft angle sensor 2 is larger than or equal to maximum operating steering shaft angle θmax and is smaller than or equal to maximum measurable steering shaft angle θlim of steering shaft angle sensor 2. Thus, the steering ratio is controlled in such a manner that the steering input unit is movable over an allowable region defined by the steering limiter when the cable is correctly attached. As a result, steering shaft angle sensor 2 does not detect an impossible value, to determine that there is a failure. Accordingly, steering shaft angle sensor 2 does not need to be reinitialized. On the other hand, since only the required range is checked to detect incorrect attachment, the operation time required for the cable-attachment diagnostic operation is shorter than in the reference example, to improve efficiency of the operation, as shown in FIG. 6A. In the first embodiment, steering shaft angle sensor 2 and cable-attachment diagnostic operation section 10a serve as a steering limiter configured to restrict movement of the steering input unit to limit the steering input.

The following describes operation effects and advantages produced by the steering control apparatus in accordance with the first embodiment. (1) The steering control apparatus including cable-attachment diagnostic operation section 10a configured to control the steering ratio of variable steering ratio control mechanism 20 to be lower than 1 when it is determined to perform the cable-attachment diagnostic operation for spiral cable 21a, is effective for reliably providing a desired wide range of steering shaft angle θlimited by the steering limiter, and thereby for reliably detecting incorrect attachment of spiral cable 21a. (2) The steering control apparatus wherein the steering limiter stops rotation of steering shaft 3 between maximum operating steering shaft angle θmax and maximum measurable steering shaft angle θlim of steering shaft angle sensor 2, is effective for providing an adequate movable range of steering shaft 3 without interference of spiral cable 21a when after a failure occurs when steering shaft 3 is turned to the maximum with the maximum steering ratio setting, steering shaft 3 is turned back to the maximum with the fixed steering ratio setting. In addition, steering shaft angle sensor 2 does not detect an impossible value, to determine that there is a failure. Accordingly, steering shaft angle sensor 2 does not need to be reinitialized. Further, since only the required range is checked to detect incorrect attachment, the operation time required for the cable-attachment diagnostic operation is shorter than in the reference example, to improve efficiency of the operation.

Figure 8:
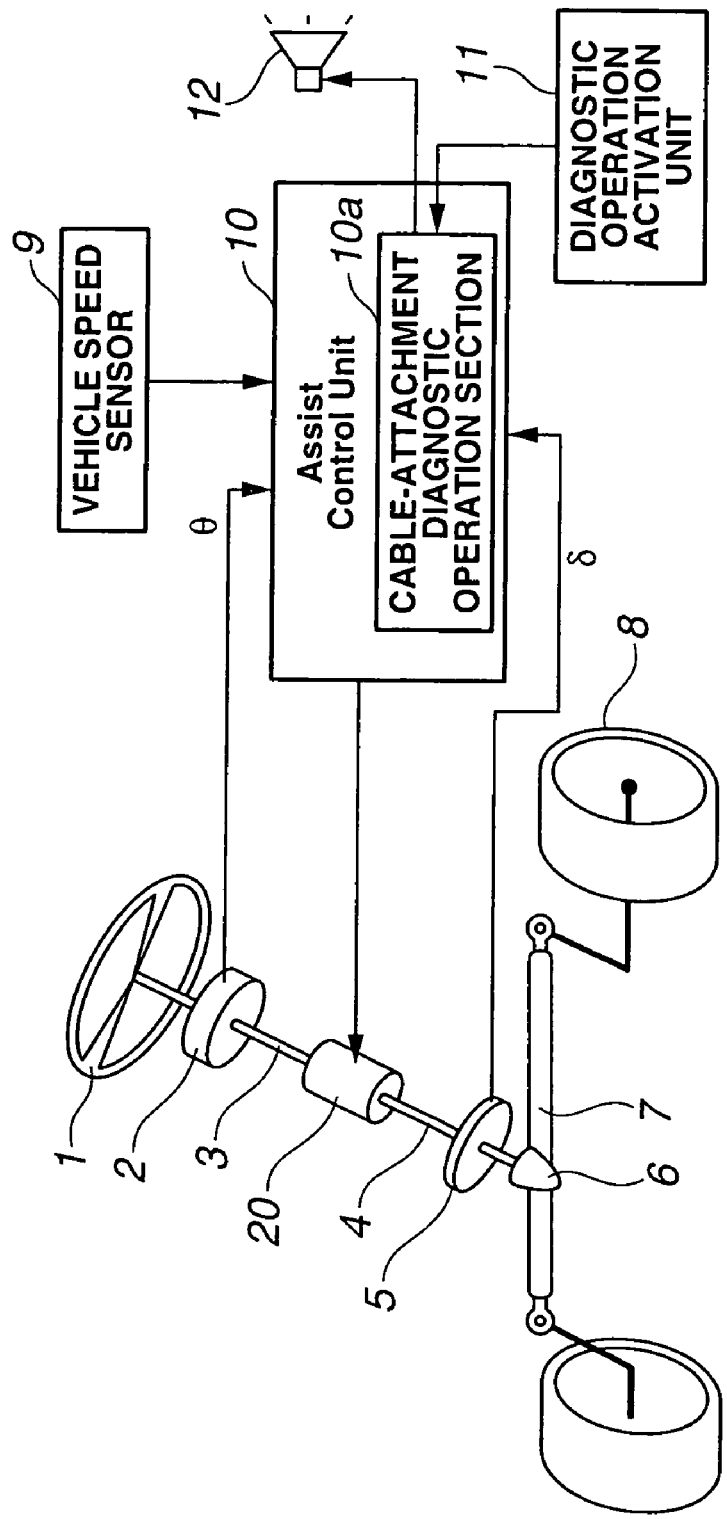
FIG. 8 is a schematic diagram showing a vehicle steering system with a steering control apparatus in accordance with a second embodiment.
Figure 9:
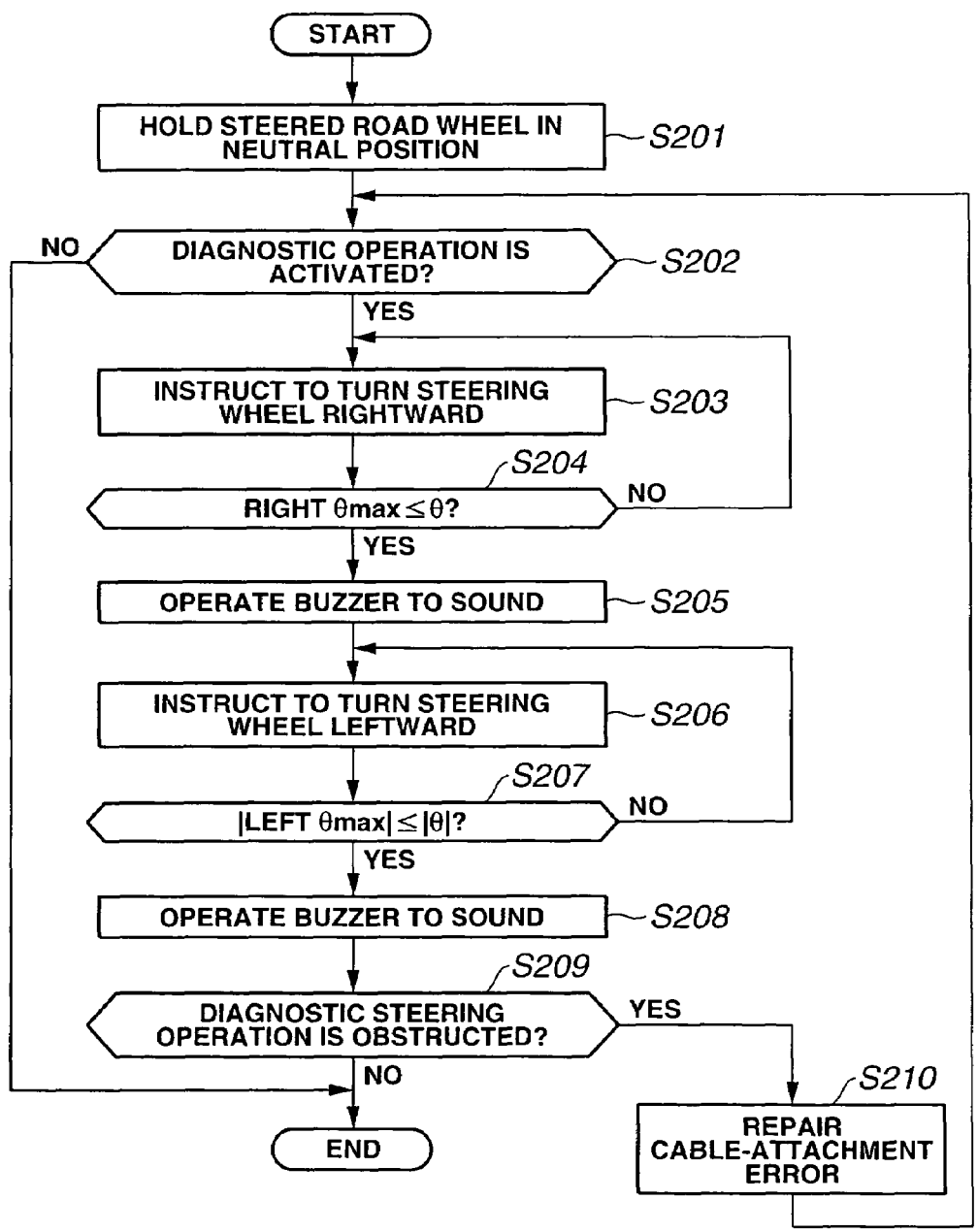
FIG. 9 is a flow chart showing a cable-attachment diagnostic operation to be performed by a cable-attachment diagnostic operation section 10a of FIG. 8.

Referring now to FIGS. 8 and 9, there is shown a steering control apparatus in accordance with a second embodiment. The steering control apparatus is basically constructed as in the first embodiment. Although steering shaft 3 (steering wheel 1) is turned by electric motor 20a in the cable-attachment diagnostic operation in the first embodiment, steering shaft 3 is turned by an operator's operation of steering wheel 1 in the cable-attachment diagnostic operation in the second embodiment. FIG. 8 is a schematic diagram showing a vehicle steering system with a steering control apparatus in accordance with the second embodiment. The steering control apparatus of the second embodiment includes an annunciator such as a buzzer 12 configured to sound to inform an operator of operational states as discussed below, in response to the control signal from cable-attachment diagnostic operation section 10a, as specifically described below. Buzzer 12 serves as an element of the steering limiter to be activated during the steering input being between the maximum operating steering input and the maximum measurable steering input, to limit the steering input.

The following describes a cable-attachment diagnostic operation for spiral cable 21a to be performed by cable-attachment diagnostic operation section 10a in accordance with the second embodiment. The cable-attachment diagnostic operation is basically performed in an assembly plant for automotive vehicles, or in a repair shop, etc. Before performing the cable-attachment diagnostic operation, variable steering ratio control mechanism 20 and steering shaft angle sensor 2 are installed to the vehicle, and the sensors are initialized. FIG. 9 is a flow chart showing the cable-attachment diagnostic operation to be performed by cable-attachment diagnostic operation section 10a.

At step S201, cable-attachment diagnostic operation section 10a neutralizes steerable wheel 8 and holds steerable wheel 8 stationary in its neutral position.

Subsequent to step S201, at step S202, cable-attachment diagnostic operation section 10a determines whether or not to perform the cable-attachment diagnostic operation, by checking the activation signal from diagnostic operation activation unit 11. When the answer to step S202 is YES, the routine proceeds to step S203. On the other hand, when the answer to step S202 is NO, the routine returns.

At step S203, cable-attachment diagnostic operation section 10a instructs an operator to turn steering wheel 1 (steering shaft 3) rightward by means of buzzer 12. At this time, electric motor 20a is freely rotatable. That translates to that steering ratio Δδ/Δθ is controlled to be zero, since pinion shaft 4 is held stationary in this operation (δ, Δδ≈0). When a required procedure is presented to the operator beforehand, it is not necessary to issue the instruction.

Subsequent to step S203, at step S204, cable-attachment diagnostic operation section 10a determines whether or not steering shaft angle θ measured by steering shaft angle sensor 2 is larger than or equal to a right maximum operating steering shaft angle θmax, which is defined as a maximum steering shaft angle when variable steering ratio control mechanism 20 regulates the steering ratio to a minimum steering ratio setting during usual vehicle driving conditions. When the answer to step S204 is YES, the routine proceeds to step S205. On the other hand, when the answer to step S204 is NO, the routine proceeds back to step S203. Thus, steps S203 and S204 are repeatedly executed until the condition of step S204 is satisfied.

At step S205, cable-attachment diagnostic operation section 10a instructs the operator to stop turning steering wheel 1 rightward by means of buzzer 12.

Subsequent to step S205, at step S206, cable-attachment diagnostic operation section 10a instructs the operator to turn steering wheel 1 (steering shaft 3) leftward by means of buzzer 12.

Subsequent to step S206, at step S207, cable-attachment diagnostic operation section 10a determines whether or not steering shaft angle θ measured by steering shaft angle sensor 2 is larger than or equal to a left maximum operating steering shaft angle θmax. When the answer to step S207 is YES, the routine proceeds to step S208. On the other hand, when the answer to step S207 is NO, the routine proceeds back to step S206. Thus, steps S206 and S207 are repeatedly executed until the condition of step S207 is satisfied.

At step S208, cable-attachment diagnostic operation section 10a instructs the operator to stop turning steering wheel 1 leftward by means of buzzer 12.

Subsequent to step S208, at step S209, cable-attachment diagnostic operation section 10a determines whether or not the diagnostic steering operation is obstructed. Specifically, a check is made to determine whether or not buzzer 12 sounds at the rightward end and the leftward end of rotation of steering wheel 1. When buzzer 12 sounds at the rightward end and the leftward end of rotation of steering wheel 1, it is determined that the rotation of steering shaft 3 is not restricted by spiral cable 21a. When the answer to step S209 is NO, the routine returns. On the other hand, when the answer to step S209 is YES, the routine proceeds to step S210.

At step S210, a repair operation is performed to cancel the detected incorrect attachment of spiral cable 21a.

The following describes an example behavior of the cable-attachment diagnostic operation in accordance with the second embodiment where spiral cable 21a is attached normally. Although steering shaft 3 (steering wheel 1) is turned by electric motor 20a in the cable-attachment diagnostic operation in the first embodiment, steering shaft 3 is turned by an operator's operation of steering wheel 1 in the cable-attachment diagnostic operation in the second embodiment. The measured value of steering shaft angle sensor 2 changes with time in the same manner as shown in FIG. 6A. The rotation of electric motor 20a that is driven by rotation of steering wheel 1 with pinion shaft 4 held stationary is also same as shown in the first embodiment. Accordingly, the following description accompanies FIG. 6A. However, electric motor 20a is not applied to with the drive current, in the second embodiment, in contrast to the first embodiment. At time t1, cable-attachment diagnostic operation section 10a determines to perform the cable-attachment diagnostic operation, by checking the activation signal from diagnostic operation activation unit 11. Subsequently, steering wheel 1 (steering shaft 3) is turned rightward by the operator in accordance with instructions from cable-attachment diagnostic operation section 10a by means of buzzer 12. That translates to that steering ratio $\Delta\delta/\Delta\theta$ is controlled to be zero, since pinion shaft 4 is held stationary in this operation ($\delta$, $\Delta\delta\approx 0$). At time t2, cable-attachment diagnostic operation section 10a determines that steering shaft angle θ measured by steering shaft angle sensor 2 is larger than or equal to a right maximum operating steering shaft angle θmax. Subsequently, cable-attachment diagnostic operation section 10a instructs the operator to stop turning steering wheel 1 rightward by means of buzzer 12. Although the determinant condition is that steering shaft angle θ is larger than or equal to θmax in the second embodiment, the determinant condition may be that steering shaft angle θ is equal to a predetermined threshold angle θ1 larger than θmax. At time t3, steering wheel 1 (steering shaft 3) is turned leftward by the operator in accordance with instructions from cable-attachment diagnostic operation section 10a by means of buzzer 12. At time t4, cable-attachment diagnostic operation section 10a determines that steering shaft angle θ measured by steering shaft angle sensor 2 is larger than or equal to a left maximum operating steering shaft angle θmax. Subsequently, cable-attachment diagnostic operation section 10a instructs the operator to stop turning steering wheel 1 leftward by means of buzzer 12. At time t5, steering wheel 1 (steering shaft 3) is turned back to its neutral position. At time t6, steering shaft angle θ returns to its neutral. Subsequently, the cable-attachment diagnostic operation is terminated.

The following describes an example behavior of the cable-attachment diagnostic operation in accordance with the second embodiment where spiral cable 21a is attached incorrectly. Specifically, in this case, spiral cable 21a is attached with an error of one rightward turn (360°) of steering shaft 3, as shown in FIG. 6A. From time t1 to time t3, cable-attachment diagnostic operation section 10a performs in the same manner as in the above-mentioned normal attachment condition. At time t31, steering shaft angle θ of steering shaft 3 exceeds the movable range limited by spiral cable 21a. As a result, the rotation of steering shaft 3 is held stationary by the tension of spiral cable 21a. Accordingly, steering shaft angle θ does not exceed left θmax, and is held at a fixed value, at this time. Therefore, cable-attachment diagnostic operation section 10a does not inform the operator of completion of leftward turning by means of buzzer 12, and thereby determines that there is an error in attachment of spiral cable 21a, and performs the repair operation.

In the second embodiment, cable-attachment diagnostic operation section 10a determines that an error is present in attachment of spiral cable 21a when steering shaft angle θ measured by steering shaft angle sensor 2 is larger than or equal to a maximum operating steering shaft angle θmax. As a result, steering shaft angle sensor 2 does not detect an impossible value, to determine that there is a failure. Accordingly, steering shaft angle sensor 2 does not need to be reinitialized. On the other hand, since only the required range is checked to detect incorrect attachment, the operation time required for the cable-attachment diagnostic operation is shorter than in the reference example, to improve efficiency of the operation, as shown in FIG. 6A.

Although buzzer 12 informs a driver of that steering shaft angle θ exceeds θmax in the second embodiment, that may be informed of by image display or lamp lighting. In addition, that may be informed of by generating a feedback force in the direction to stop the rotation of steering shaft 3 by means of electric motor 20a. When steering shaft angle θ reaches θlim, electric motor 20a may be driven to generate a feedback force in the direction to stop the rotation of steering shaft 3. The feedback force may be generated by means of an electric power-steering mechanism (not shown). This reliably prevents steering shaft angle sensor 2 from falling in a failure condition.

In the second embodiment, the following operation effects and advantages are produced in addition to those in the first embodiment. (3) The steering control apparatus including buzzer 12 configured to inform an operator of that steering shaft angle θ is larger than maximum operating steering shaft angle θmax and smaller than or equal to maximum measurable steering shaft angle θlim of steering shaft angle sensor 2, in the cable-attachment diagnostic operation, is effective for reducing the load of manual operation by properly providing information that a required operation is completed.

Figure 10:
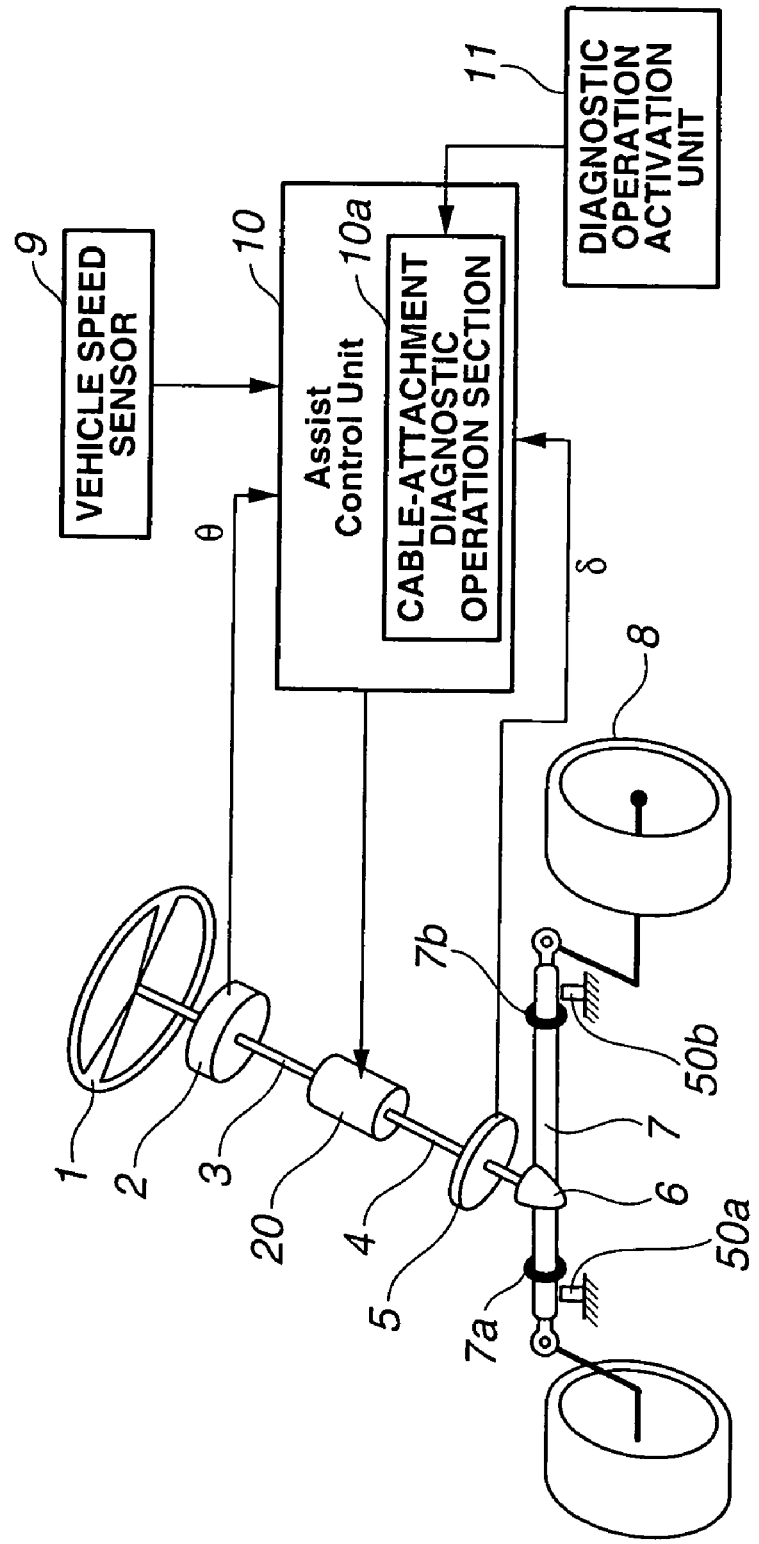
FIG. 10 is a schematic diagram showing a vehicle steering system with a steering control apparatus in accordance with a third embodiment.

Referring now to FIGS. 10 through 13, there is shown a steering control apparatus in accordance with a third embodiment. The steering control apparatus is basically constructed as in the first and second embodiments. Although steering shaft 3 (steering wheel 1) is turned with pinion shaft 4 held stationary in the cable-attachment diagnostic operation in the first and second embodiments, pinion shaft 4 is not held stationary in the cable-attachment diagnostic operation in the third embodiment. FIG. 10 is a schematic diagram showing a vehicle steering system with a steering control apparatus in accordance with the third embodiment. In the steering control apparatus of the third embodiment, rack shaft 7 includes contact members 7a, 7b formed in its right and left portions, and adapted to be in contact with rack stoppers 50a, 50b to mechanically restrict the axial movement of rack shaft 7. Rack stoppers 50a, 50b serve as the steering limiter, when the shaft steering ratio is controlled in such a manner that the rotation angle of the steering shaft reaches a maximum operating steering shaft angle for a usual driving condition of the vehicle when the rack shaft is in contact with the rack stopper.

Figure 11:
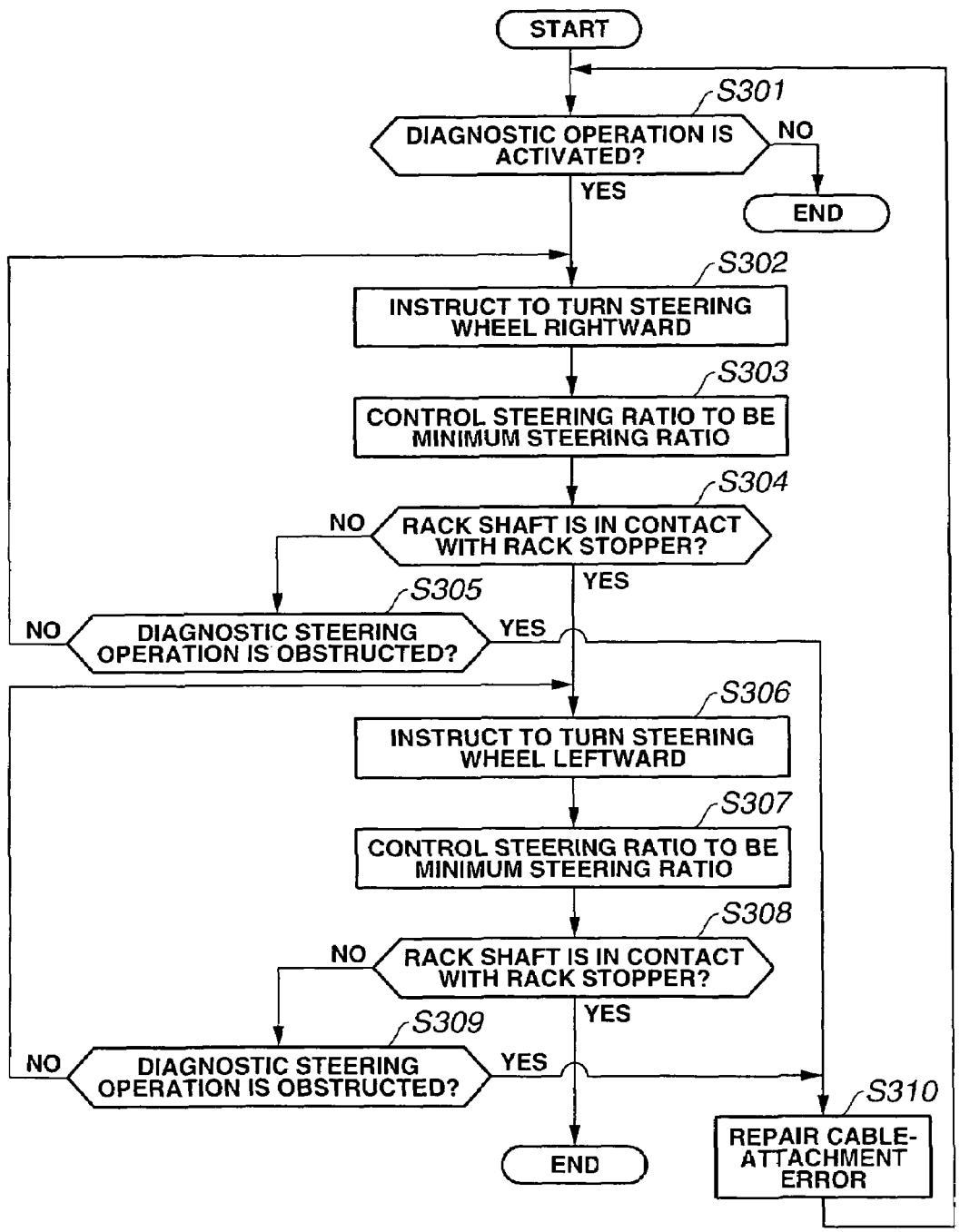
FIG. 11 is a flow chart showing a cable-attachment diagnostic operation to be performed by a cable-attachment diagnostic operation section 10a of FIG. 10.

The following describes a cable-attachment diagnostic operation for spiral cable 21a to be performed by cable-attachment diagnostic operation section 10a in accordance with the third embodiment. The cable-attachment diagnostic operation is basically performed in an assembly plant for automotive vehicles, or in a repair shop, etc. Before performing the cable-attachment diagnostic operation, variable steering ratio control mechanism 20 and steering shaft angle sensor 2 are installed to the vehicle, and the sensors are initialized. The locking mechanism of variable steering ratio control mechanism 20 is inactivated. FIG. 11 is a flow chart showing the cable-attachment diagnostic operation to be performed by cable-attachment diagnostic operation section 10a.

At step S301, cable-attachment diagnostic operation section 10a determines whether or not to perform the cable-attachment diagnostic operation, by checking the activation signal from diagnostic operation activation unit 11. When the answer to step S301 is YES, the routine proceeds to step S302. On the other hand, when the answer to step S301 is NO, the routine returns.

At step S302, cable-attachment diagnostic operation section 10a instructs an operator to turn steering wheel 1 (steering shaft 3) rightward. When a required procedure is presented to the operator beforehand, it is not necessary to issue the instruction.

Subsequent to step S302, at step S303, cable-attachment diagnostic operation section 10a controls the steering ratio to be the minimum steering ratio setting so that maximum operating steering shaft angle θmax is in agreement with maximum pinion shaft angle δmax defined by rack stoppers 50a, 50b. As shown in pattern (3) in FIG. 4, assist control unit 10 controls steering ratio Δδ/Δθ to be lower than 1 when steering shaft 3 is turned rightward, where the rotational speed of rotor 23 is controlled to be lower than that of steering shaft 3, to speed down the rotational speed of pinion shaft 4 with respect to that of steering shaft 3.

Subsequent to step S303, at step S304, cable-attachment diagnostic operation section 10a determines whether or not the movement of rack shaft 7 is restricted by rack stoppers 50a, 50b, or whether or not rack shaft 7 is in contact with rack stoppers 50a, 50b. This check may be implemented by checking whether or not steering shaft angle θ measured by steering shaft angle sensor 2 is larger than or equal to maximum operating steering shaft angle θmax. The check may be implemented by an operator's checking whether or not a predetermined amount of rotation of steering wheel 1 is completed. When the answer to step S304 is YES, the routine proceeds to step S306. On the other hand, when the answer to step S304 is NO, the routine proceeds to step S305.

At step S305, cable-attachment diagnostic operation section 10a determines whether or not the diagnostic steering operation is obstructed, or whether or not rotation of steering wheel 1 is restricted by spiral cable 21a before rotation of steering wheel 1 is restricted by rack stoppers 50a, 50b. When the answer to step S305 is YES, the routine proceeds to step S310. On the other hand, when the answer to step S305 is NO, the routine proceeds to step S302. Thus, steps S302 through S304 are repeatedly executed until one of the condition of step S304 and the condition of step S305 is satisfied.

At step S306, cable-attachment diagnostic operation section 10a instructs an operator to turn steering wheel 1 (steering shaft 3) leftward. When a required procedure is presented to the operator beforehand, it is not necessary to issue the instruction.

Subsequent to step S306, at step S307, cable-attachment diagnostic operation section 10a controls the steering ratio to be the minimum steering ratio setting so that maximum operating steering shaft angle θmax is in agreement with maximum pinion shaft angle δmax defined by rack stoppers 50a, 50b. As shown in pattern (3) in FIG. 4, assist control unit 10 controls steering ratio Δδ/Δθ to be lower than 1 when steering shaft 3 is turned rightward, where the rotational speed of rotor 23 is controlled to be lower than that of steering shaft 3, to speed down the rotational speed of pinion shaft 4 with respect to that of steering shaft 3.

Subsequent to step S307, at step S308, cable-attachment diagnostic operation section 10a determines whether or not the movement of rack shaft 7 is restricted by rack stoppers 50a, 50b, or whether or not rack shaft 7 is in contact with rack stoppers 50a, 50b. This check is same as at step S304. When the answer to step S308 is YES, the routine returns. On the other hand, when the answer to step S308 is NO, the routine proceeds to step S309.

At step S309, cable-attachment diagnostic operation section 10a determines whether or not the diagnostic steering operation is obstructed, or whether or not rotation of steering wheel 1 is restricted by spiral cable 21a before rotation of steering wheel 1 is restricted by rack stoppers 50a, 50b. When the answer to step 5309 is YES, the routine proceeds to step S310. On the other hand, when the answer to step S309 is NO, the routine proceeds to step S306. Thus, steps S306 through S308 are repeatedly executed until one of the condition of step S308 and the condition of step S309 is satisfied.

At step S310, a repair operation is performed to cancel incorrect attachment of spiral cable 21a.

Figure 12:
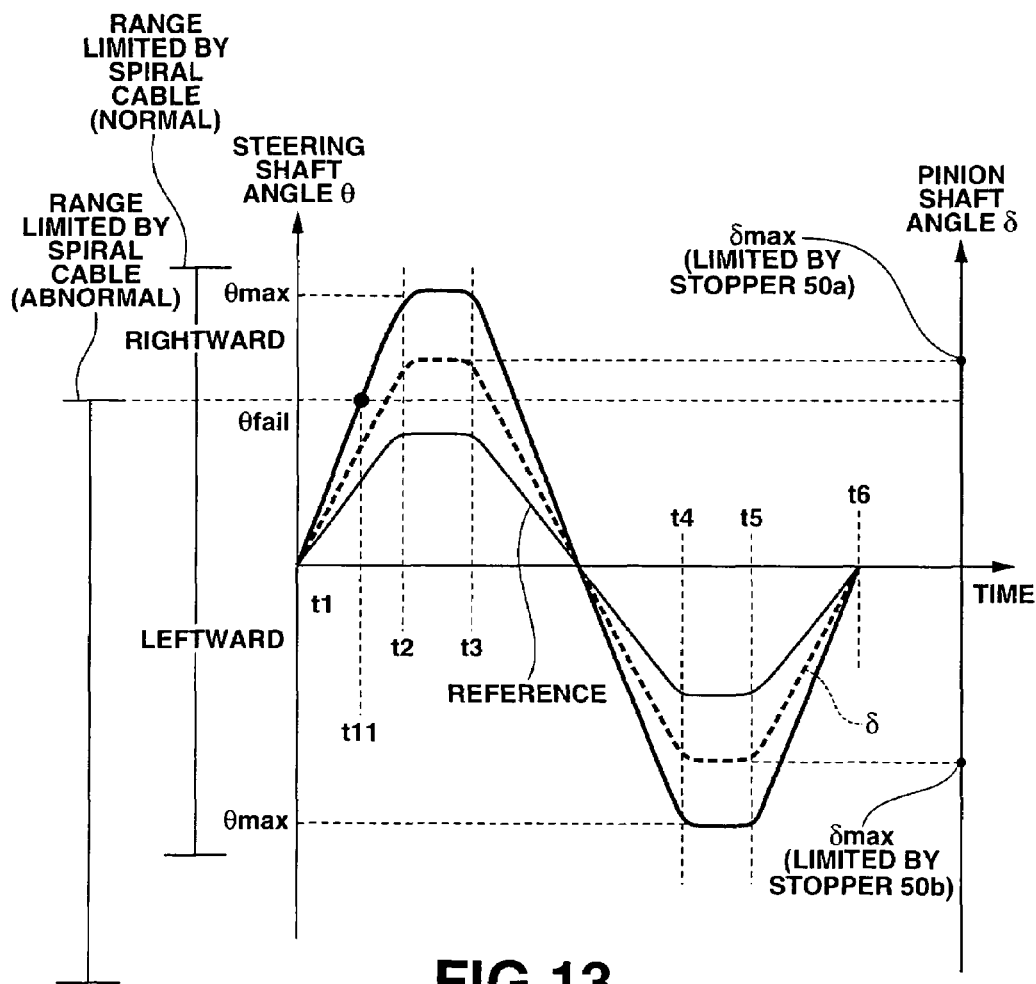
FIG. 12 is a view showing a behavior of the cable-attachment diagnostic operation over time in accordance with the third embodiment.

FIG. 12 is a view showing a behavior of the cable-attachment diagnostic operation over time in accordance with the third embodiment. In FIG. 12, a thin solid line represents a reference example of cable-attachment diagnostic operation where steering shaft angle θ changes with time in case spiral cable 21a is attached normally. In FIG. 12, a thick solid line represents an example behavior of the cable-attachment diagnostic operation in accordance with the third embodiment where steering shaft angle θ changes with time in case spiral cable 21a is attached normally. In FIG. 12, a thick dotted line represents an example behavior of the cable-attachment diagnostic operation in accordance with the third embodiment where pinion shaft angle δ changes with time in case spiral cable 21a is attached correctly. On the left side of FIG. 12, the movable range due to spiral cable 21a is shown along the vertical direction. When steering shaft angle θ is in the movable range due to spiral cable 21a, rotation of steering shaft 3 is not interfered by spiral cable 21a. On the other hand, when steering shaft angle θ is going out of the movable range due to spiral cable 21a, rotation of steering shaft 3 is interfered and restricted by spiral cable 21a. At time t1, cable-attachment diagnostic operation section 10a determines to perform the cable-attachment diagnostic operation, by checking the activation signal from diagnostic operation activation unit 11. Subsequently, steering wheel 1 (steering shaft 3) is turned rightward by the operator in accordance with instructions from cable-attachment diagnostic operation section 10a. Steering ratio Δδ/Δθ is controlled to be the minimum steering ratio setting lower than 1. Accordingly, pinion shaft angle δ is controlled to be smaller than steering shaft angle $\theta$, as shown in FIG. 12. At time t2, steering shaft angle $\theta$ measured by steering shaft angle sensor 2 exceeds maximum operating steering shaft angle $\theta$max, so that contact member 7a of rack shaft 7 is in contact with rack stopper 50a. Although the determinant condition is that steering shaft angle $\theta$ is larger than or equal to $\theta$max in the third embodiment, the determinant condition may be that steering shaft angle $\theta$ is equal to a predetermined threshold angle $\theta 1$ larger than $\theta$max. At time t3, steering wheel 1 (steering shaft 3) is turned leftward by the operator in accordance with instructions from cable-attachment diagnostic operation section 10a. At time t4, steering shaft angle $\theta$ measured by steering shaft angle sensor 2 exceeds maximum operating steering shaft angle $\theta$max, so that contact member 7b of rack shaft 7 is in contact with rack stopper 50b. At time t5, steering wheel 1 (steering shaft 3) is turned back to its neutral position. At time t6, steering shaft angle $\theta$ returns to its neutral. Subsequently, the cable-attachment diagnostic operation is terminated. It is optional to provide a section for neutralizing steering wheel 1 in assist control unit 10 so that it is unnecessary to manually turn steering wheel 1 back to its neutral position.

The following describes an example behavior of the cable-attachment diagnostic operation in accordance with the third embodiment where spiral cable 21a is attached incorrectly. Specifically, in this case, spiral cable 21a is attached with an error of one leftward turn (360°) of steering shaft 3, as shown in FIG. 12. At time t1, cable-attachment diagnostic operation section 10a performs in the same manner as in the above-mentioned normal attachment condition. At time t11, steering shaft angle $\theta$ of steering shaft 3 exceeds the movable range limited by spiral cable 21a. As a result, the rotation of electric motor 20a is held stationary by the tension of spiral cable 21a. Accordingly, contact member 7a of rack shaft 7 is out of contact with rack stopper 50a. Therefore, cable-attachment diagnostic operation section 10a determines that there is an error in attachment of spiral cable 21a, and performs the repair operation.

Figure 13:
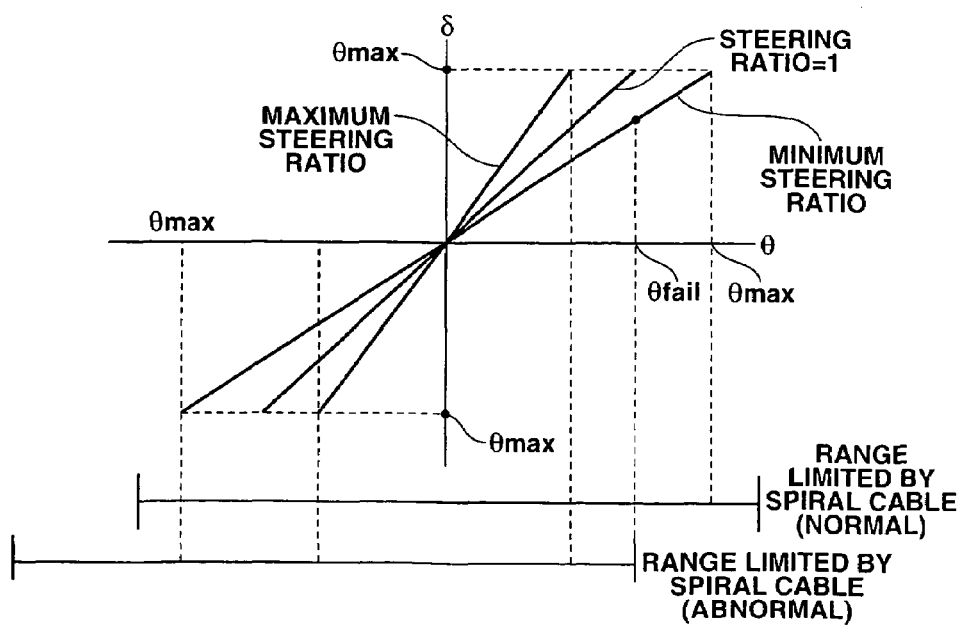
FIG. 13 is a view showing a relationship between a steering shaft angle $\theta$ of the steering shaft and a pinion shaft angle $\delta$ of the pinion shaft of FIG. 10.

The following describes a reference example of cable-attachment diagnostic operation, and differences between the cable-attachment diagnostic operation of the third embodiment and the reference example. In the cable-attachment diagnostic operation of the reference example, the steering ratio is controlled in the same manner as in normal driving conditions. FIG. 13 is a view showing a relationship between steering shaft angle $\theta$ of the steering shaft and pinion shaft angle $\delta$ in the third embodiment. As shown in FIG. 13, during the usual driving conditions, the steering ratio is controlled by setting pinion shaft angle $\delta$ with respect to steering shaft angle $\theta$ in accordance with vehicle speed and etc. In a typical steering system, the steering ratio is set to be higher than or equal to 1 (or a maximum steering ratio setting) during the vehicle being at rest, to reduce the load of driver's steering operation. The cable-attachment diagnostic operation is basically performed in an assembly plant for automotive vehicles, or in a repair shop, etc. Before performing the cable-attachment diagnostic operation, variable steering ratio control mechanism 20 and steering shaft angle sensor 2 are installed to the vehicle, and the sensors are initialized. When an operator only operates steering wheel 1 at this time, pinion shaft angle $\delta$ is controlled by variable steering ratio control mechanism 20 to change as shown by a dotted line in FIG. 12. On the other hand, steering shaft angle $\theta$ changes as shown by a thin solid line in FIG. 12. Thus, pinion shaft angle $\delta$ is controlled to be larger than steering shaft angle $\theta$, that is, the steering ratio $\Delta\delta/\Delta\theta$ is controlled to be higher than 1. Suppose that spiral cable 21a is incorrectly attached so that the movable range of steering shaft 3 is smaller by one rightward turn (360°) as shown in FIG. 12. Specifically, the movable range of steering shaft angle $\theta$ is limited within $\theta$fail by spiral cable 21a. As steering shaft angle $\theta$ increases, pinion shaft angle $\delta$ increases by an inclination higher than steering shaft angle $\theta$. As a result, contact member 7a of rack shaft 7 is brought to be in contact with rack stopper 50a before steering shaft angle $\theta$ reaches $\theta$fail, so that steering wheel 1 moves no longer. Therefore, the incorrect attachment of spiral cable 21a is not detected.

In contrast to the reference example, the steering control apparatus of the third embodiment controls the steering ratio to be the minimum steering ratio setting lower than 1, with which when steering shaft angle $\theta$ reaches maximum operating steering shaft angle $\theta$max, pinion shaft angle $\delta$ reaches pinion shaft angle $\delta$max defined by rack stoppers 50a, 50b. Accordingly, steering shaft angle $\theta$ reaches maximum operating steering shaft angle $\theta$max before pinion shaft angle $\delta$ reaches maximum pinion shaft angle $\delta$max. Therefore, when spiral cable 21a is incorrectly attached, the incorrect attachment is reliably detected. Suppose the steering control apparatus of the third embodiment is confronted with the situation of FIG. 7 where a failure occurs in the steering system while variable steering ratio control mechanism 20 is performing the steering ratio control to set the steering ratio to the maximum steering ratio setting, and the control mode is switched to a conventional steering control mode in accordance with the occurrence of failure, so as to generate a maximum deviation in the neutral position of steering shaft 3. In this situation, in case maximum operating steering shaft angle $\theta$max is within the movable range limited by spiral cable 21a, steering shaft 3 is allowed to rotate without interference of spiral cable 21a even during failure conditions. Steering shaft angle $\theta$ is limited within maximum operating steering shaft angle $\theta$max by the steering limiter including contact members 7a, 7b and rack stoppers 50a, 50b. As a result, steering shaft angle sensor 2 does not detect an impossible value, to determine that there is a failure. Accordingly, steering shaft angle sensor 2 does not need to be reinitialized. On the other hand, since only the required range is checked to detect incorrect attachment, the operation time required for the cable-attachment diagnostic operation is shorter than in the reference example, to improve efficiency of the operation.

As mentioned above, the steering control apparatus of the third embodiment controls the steering ratio to be constantly the minimum steering ratio setting. However, it is optional to control the steering ratio in such any other manner that when steering shaft angle $\theta$ reaches maximum operating steering shaft angle $\theta$max, pinion shaft angle $\delta$ of pinion shaft 4 reaches maximum pinion shaft angle $\delta$max. In other words, the steering control apparatus may be configured wherein the cable-attachment diagnostic controller is configured to control the steering ratio in such a manner that an average steering ratio as a rate of the steering output with respect to the steering input is smaller than or equal to a minimum setting of a usual driving condition of the vehicle. For example, steering ratio $\Delta\delta/\Delta\theta$ is set to a steering ratio setting still lower than the minimum steering ratio setting at and after start of the operation, and is changed to 1 or higher from a midpoint of the operation.

The steering control apparatus of the third embodiment produces the following operation effects and advantages. (4) The steering control apparatus including contact members 7a, 7b and rack stoppers 50a, 50b as the steering limiter adapted to restrict the axial movement of rack shaft 7, so that when steering shaft angle $\theta$ reaches maximum operating steering shaft angle $\theta$max, pinion shaft angle $\delta$ reaches maximum possible maximum pinion shaft angle δmax, is effective for performing the cable-attachment diagnostic operation without holding steerable wheel 8 in its neutral position.

Figure 14:
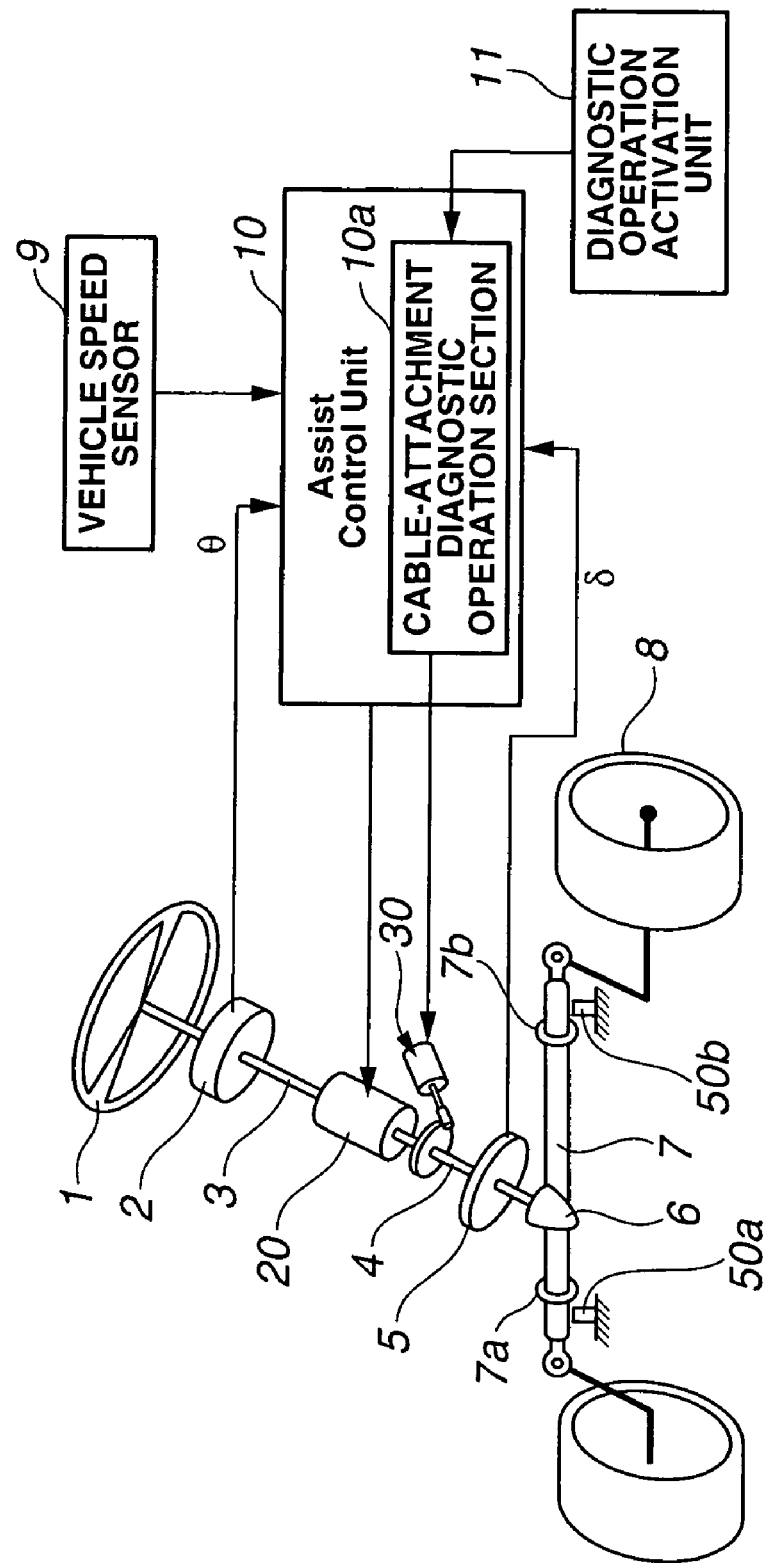
FIG. 14 is a schematic diagram showing a vehicle steering system with a steering control apparatus in accordance with a fourth embodiment.
Figure 15:
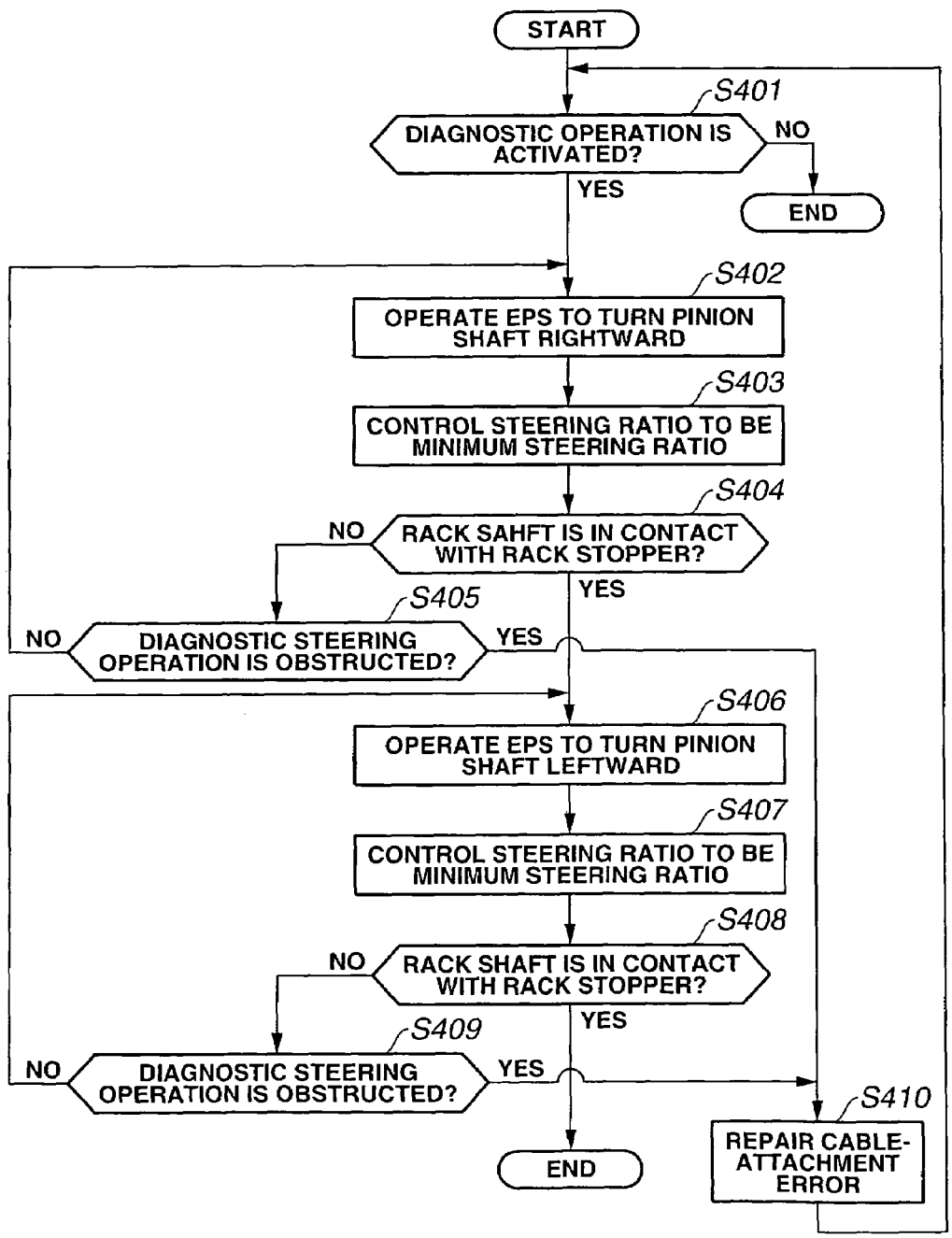
FIG. 15 is a flow chart showing a cable-attachment diagnostic operation to be performed by a cable-attachment diagnostic operation section 10a of FIG. 14.

Referring now to FIGS. 14 and 15, there is shown a steering control apparatus in accordance with a fourth embodiment. The steering control apparatus is basically constructed as in the third embodiment. Although steering shaft 3 (steering wheel 1) is turned by an operator in the cable-attachment diagnostic operation in the third embodiment, pinion shaft 4 is turned by an electric power steering unit 30 in the cable-attachment diagnostic operation in the fourth embodiment. FIG. 14 is a schematic diagram showing a vehicle steering system with a steering control apparatus in accordance with a fourth embodiment. An electric power steering unit (EPS) 30 is mounted to pinion shaft 4 for boosting steering effort of a driver. EPS 30 is configured to generate a desired torque in accordance with a driver's steering torque and the vehicle speed during usual driving conditions. EPS 30 of the fourth embodiment is configured to be controllable in accordance with a control command from cable-attachment diagnostic operation section 10a. It is optional to provide a control unit for EPS 30 separately which operates based on communication with assist control unit 10.

The following describes a cable-attachment diagnostic operation for spiral cable 21a to be performed by cable-attachment diagnostic operation section 10a in accordance with the fourth embodiment. The cable-attachment diagnostic operation is basically performed in an assembly plant for automotive vehicles, or in a repair shop, etc. Before performing the cable-attachment diagnostic operation, variable steering ratio control mechanism 20 and steering shaft angle sensor 2 are installed to the vehicle, and the sensors are initialized. The locking mechanism of variable steering ratio control mechanism 20 is inactivated. FIG. 15 is a flow chart showing the cable-attachment diagnostic operation to be performed by cable-attachment diagnostic operation section 10a.

At step S401, cable-attachment diagnostic operation section 10a determines whether or not to perform the cable-attachment diagnostic operation, by checking the activation signal from diagnostic operation activation unit 11. When the answer to step S401 is YES, the routine proceeds to step S402. On the other hand, when the answer to step S401 is NO, the routine returns.

At step S402, cable-attachment diagnostic operation section 10a outputs a control command to EPS 30 to turn pinion shaft 4 rightward.

Subsequent to step S402, at step S403, cable-attachment diagnostic operation section 10a controls the steering ratio to be the minimum steering ratio setting so that maximum operating steering shaft angle θmax is in agreement with maximum pinion shaft angle δmax defined by rack stoppers 50a, 50b. As shown in pattern (3) in FIG. 4, assist control unit 10 controls steering ratio Δδ/Δθ to be lower than 1 when pinion shaft 4 is turned rightward, where the rotational speed of rotor 23 is controlled to be lower than that of pinion shaft 4, to speed up the rotational speed of steering shaft 3 with respect to that of pinion shaft 4.

Subsequent to step S403, at step S404, cable-attachment diagnostic operation section 10a determines whether or not the movement of rack shaft 7 is restricted by rack stoppers 50a, 50b, or whether or not rack shaft 7 is in contact with rack stoppers 50a, 50b. This check may be implemented by checking whether or not steering shaft angle θ measured by steering shaft angle sensor 2 is larger than or equal to maximum operating steering shaft angle θmax. The check may be based on a change in the current command to EPS 30. When the answer to step S404 is YES, the routine proceeds to step S406. On the other hand, when the answer to step S404 is NO, the routine proceeds to step S405.

At step S405, cable-attachment diagnostic operation section 10a determines whether or not the diagnostic steering operation is obstructed, or whether or not rotation of steering wheel 1 is restricted by spiral cable 21a before rotation of steering wheel 1 is restricted by rack stoppers 50a, 50b. When the answer to step S405 is YES, the routine proceeds to step S410. On the other hand, when the answer to step S405 is NO, the routine proceeds to step S402. Thus, steps S402 through S404 are repeatedly executed until one of the condition of step S404 and the condition of step S405 is satisfied. The determination at step S405 may be performed by monitoring the steering load in accordance with the current value of electric motor 20a or the current value of EPS 30.

At step S406, cable-attachment diagnostic operation section 10a outputs a control command to EPS 30 to turn pinion shaft 4 leftward.

Subsequent to step S406, at step S407, cable-attachment diagnostic operation section 10a controls the steering ratio to be the minimum steering ratio setting so that maximum operating steering shaft angle θmax is in agreement with maximum pinion shaft angle δmax defined by rack stoppers 50a, 50b. As shown in pattern (3) in FIG. 4, assist control unit 10 controls steering ratio Δδ/Δθ to be lower than 1 when pinion shaft 4 is turned rightward, where the rotational speed of rotor 23 is controlled to be lower than that of pinion shaft 4, to speed up the rotational speed of steering shaft 3 with respect to that of pinion shaft 4.

Subsequent to step S407, at step S408, cable-attachment diagnostic operation section 10a determines whether or not the movement of rack shaft 7 is restricted by rack stoppers 50a, 50b, or whether or not rack shaft 7 is in contact with rack stoppers 50a, 50b. This check is same as at step S404. When the answer to step S408 is YES, the routine returns. On the other hand, when the answer to step S408 is NO, the routine proceeds to step S409.

At step S409, cable-attachment diagnostic operation section 10a determines whether or not the diagnostic steering operation is obstructed, or whether or not rotation of steering wheel 1 is restricted by spiral cable 21a before rotation of steering wheel 1 is restricted by rack stoppers 50a, 50b. When the answer to step S409 is YES, the routine proceeds to step S410. On the other hand, when the answer to step S409 is NO, the routine proceeds to step S406. Thus, steps S406 through S408 are repeatedly executed until one of the condition of step S408 and the condition of step S409 is satisfied.

At step S410, a repair operation is performed to cancel the incorrect attachment of spiral cable 21a.

As discussed above, although steering wheel 1 is turned by an operator in the cable-attachment diagnostic operation in the third embodiment, pinion shaft 4 is turned by an electric power steering unit 30 in the cable-attachment diagnostic operation in the fourth embodiment.

The steering control apparatus of the fourth embodiment produces the following operation effects and advantages in addition to the operation effects and advantages of the third embodiment. (5) The steering control apparatus including electric power steering unit 30 and configured to operate electric power steering unit 30 to move rack shaft 7 so that contact members 7a, 7b is in contact with rack stoppers 50a, 50b, is effective for automatically performing the cable-attachment diagnostic operation. Attachment of spiral cable 21a is reliably diagnosed without holding steerable wheel 8 in its neutral position.

Referring now to FIGS. 16 through 25, there is shown a steering control apparatus in accordance with a fifth embodiment. The steering control apparatus is basically constructed as in the third embodiment. In the fifth embodiment, the precondition for the cable-attachment diagnostic operation is studied and defined more clearly, and the steering control apparatus is constructed based on the precondition.

Figure 16:
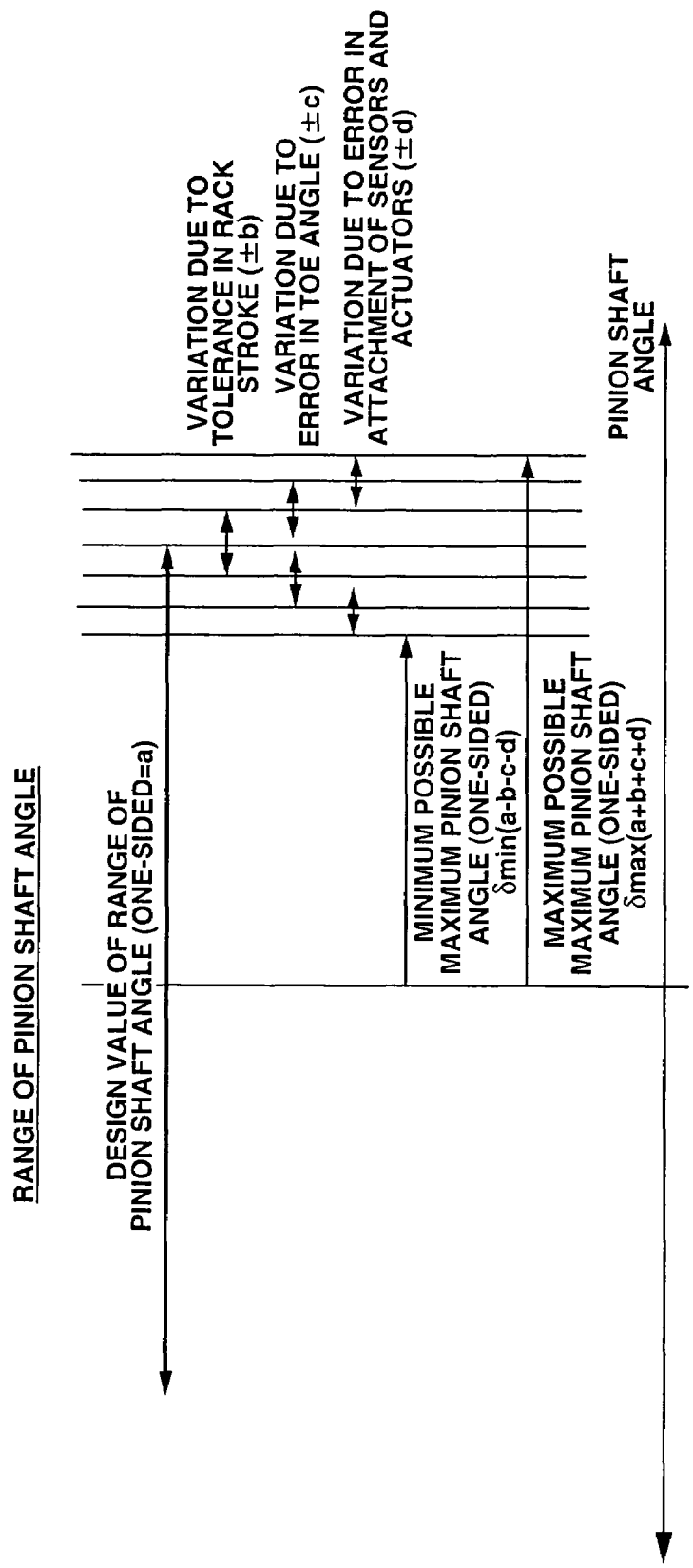
FIG. 16 is a view showing a relationship between a minimum possible maximum pinion shaft angle $\delta$min and a maximum possible maximum pinion shaft angle $\delta$max, in consideration of possible errors and tolerances in pinion shaft angle $\delta$.

The following discusses the range of pinion shaft angle $\delta$. FIG. 16 is a view showing a relationship between a minimum possible maximum pinion shaft angle and a maximum possible maximum pinion shaft angle, in consideration of possible errors and tolerances in pinion shaft angle $\delta$. In general, there is possible variations in the actual value of pinion shaft angle $\delta$ with respect to the design value of pinion shaft angle $\delta$ due to various factors such as a tolerance in rack stroke and errors in adjusted toe angle. In this embodiment, it is assumed or defined as shown in FIG. 16 that the design value of one-sided range of pinion shaft angle $\delta$ is equal to a, a variation in pinion shaft angle $\delta$ due to the tolerance in rack stroke is equal to ±b, a variation in pinion shaft angle $\delta$ due to the error in toe angle is equal to ±c, and a variation in pinion shaft angle $\delta$ due to errors in attachment of steering shaft angle sensor 2 and actuators such as variable steering ratio control mechanism 20 is equal to ±d. A minimum possible maximum pinion shaft angle $\delta$min (one-sided) is defined as a maximum pinion shaft angle when each of the tolerances and the errors concerned is a negative maximum, i.e. $\delta$min=(a−b−c−d). A maximum possible maximum pinion shaft angle $\delta$max (one-sided) is defined as a maximum pinion shaft angle when each of the tolerances and the errors concerned is a positive maximum, i.e. $\delta$min=(a+b+c+d). In the fifth embodiment, the steering control apparatus is constructed in consideration of the above discussed variation in pinion shaft angle $\delta$.

Figure 17:
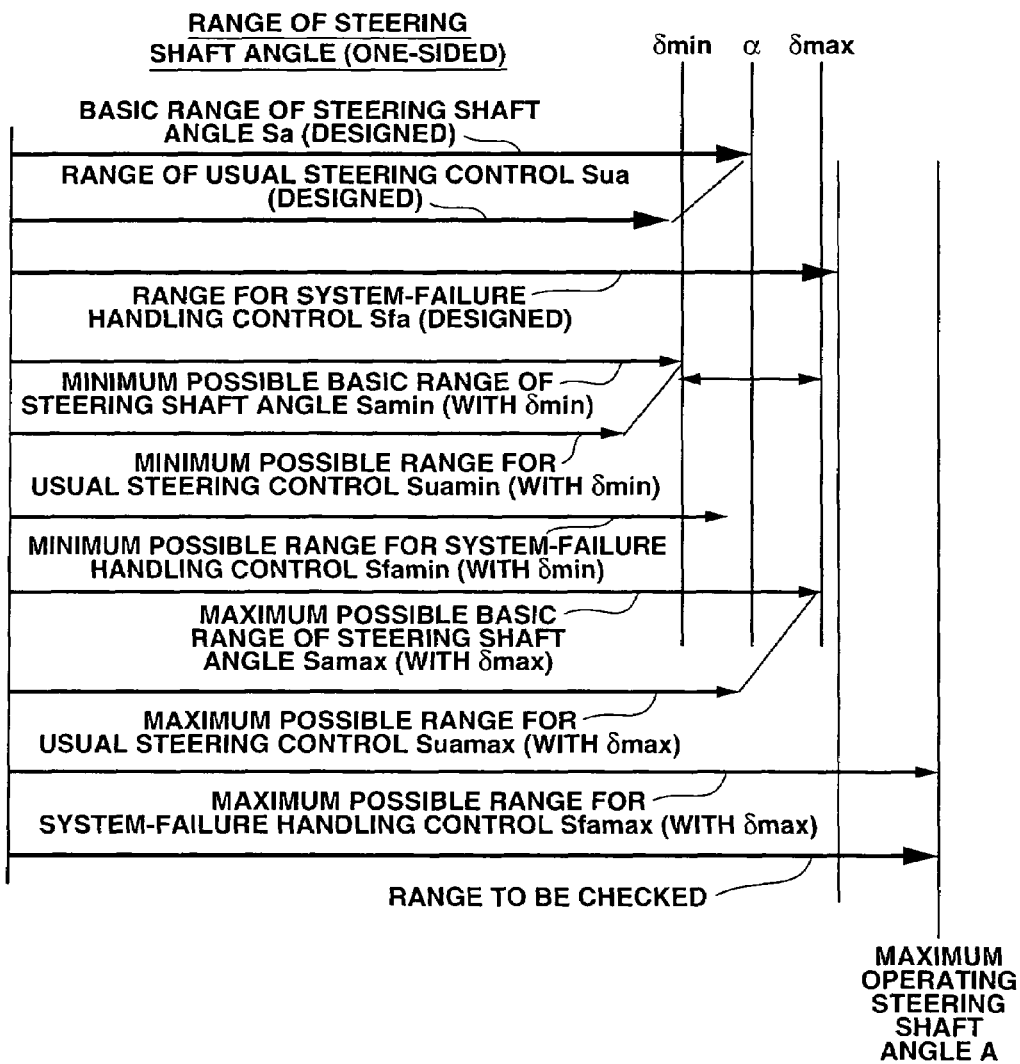
FIG. 17 is a view showing required ranges of steering shaft angle $\theta$.
Figure 18:
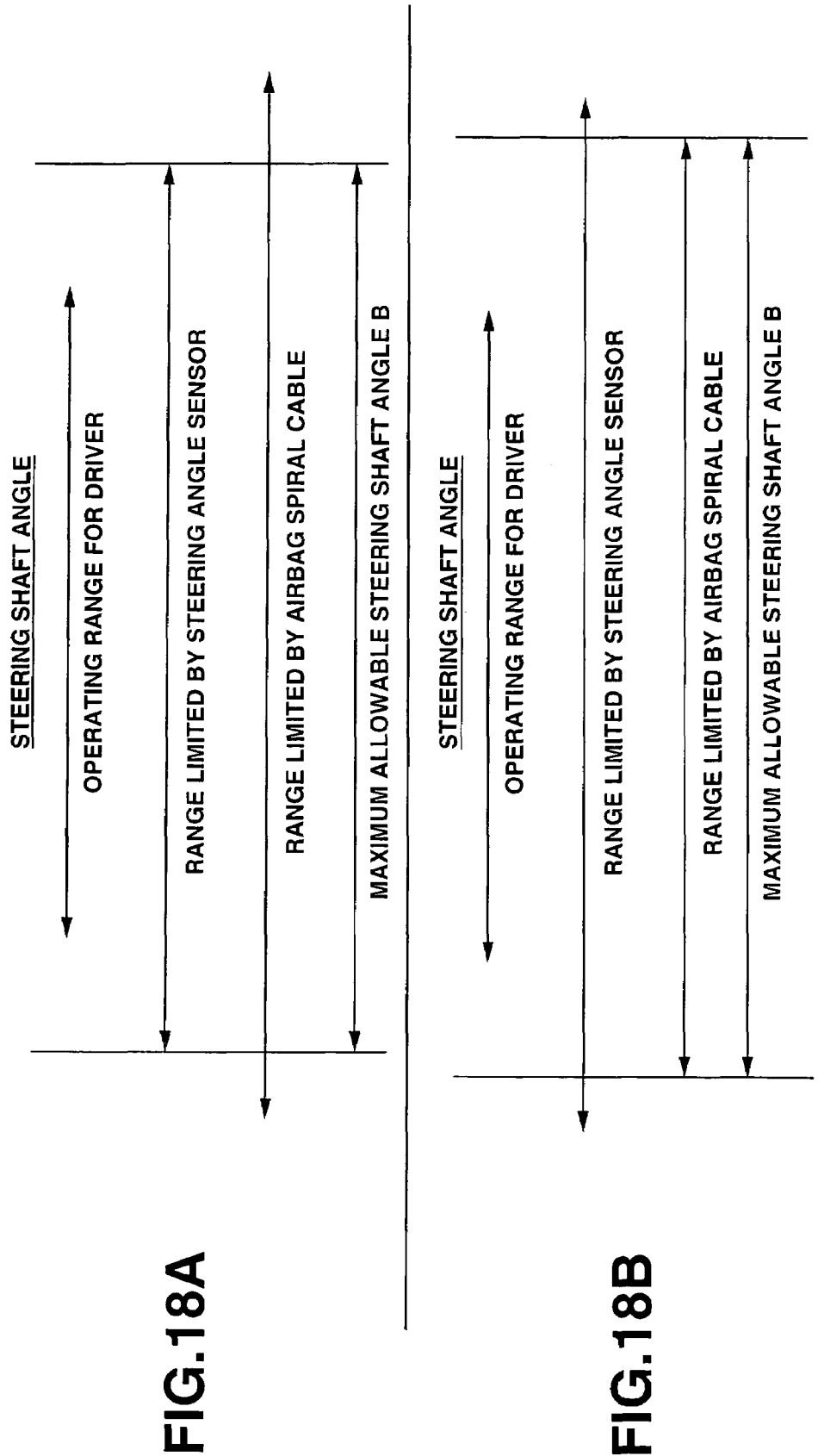
FIGS. 18A and 18B are views showing examples of a maximum allowable steering shaft angle.

The following discusses the range of steering shaft angle $\theta$. FIG. 17 is a view showing required ranges of steering shaft angle $\theta$. Since the steering system is basically designed symmetrically, the following discussion focuses on one-sided range of steering shaft angle $\theta$. A design basic range of steering shaft angle $\theta$ is represented by Sa, a design operating range of steering shaft angle $\theta$ for usual steering control in accordance with Sa is represented by Sua, which is smaller than Sa, and a design operating range of steering shaft angle $\theta$ for system-failure handling control in accordance with Sa is represented by Sfa, which is larger than Sa. The system-failure handling control is performed when a failure occurs to maximize the deviation of the neutral position of steering shaft angle $\theta$. A minimum possible range of steering shaft angle $\theta$ (one-sided) is determined in consideration of minimum possible maximum pinion shaft angle $\delta$min with respect to design basic range of steering shaft angle Sa, and represented by Samin. Similarly, a minimum possible range of steering shaft angle $\theta$ for usual steering control is determined in consideration of minimum possible maximum pinion shaft angle $\delta$min with respect to the design operating range of steering shaft angle $\theta$ for usual steering control Sua, and represented by Suamin. Further, a minimum possible range of steering shaft angle $\theta$ for system-failure handling control is determined in consideration of minimum possible maximum pinion shaft angle $\delta$min with respect to the design operating range of steering shaft angle $\theta$ for system-failure handling control Sfa, and represented by Sfamin. A maximum possible range of steering shaft angle $\theta$ (one-sided) is determined in consideration of maximum possible maximum pinion shaft angle $\delta$max with respect to design basic range of steering shaft angle Sa, and represented by Samax. Similarly, a maximum possible range of steering shaft angle $\theta$ for usual steering control is determined in consideration of maximum possible maximum pinion shaft angle $\delta$max with respect to the design operating range of steering shaft angle $\theta$ for usual steering control Sua, and represented by Suamax. Further, a maximum possible range of steering shaft angle $\theta$ for system-failure handling control is determined in consideration of maximum possible maximum pinion shaft angle $\delta$max with respect to the design operating range of steering shaft angle $\theta$ for system-failure handling control Sfa, and represented by Sfamax. As shown in FIG. 17, the maximum possible range of steering shaft angle for system-failure handling control Sfamax needs to be investigated or verified in consideration of tolerances and errors in the system. The maximum value of range Sfamax is represented by A.

On the other hand, a maximum available steering shaft angle or maximum allowable steering shaft angle is defined as a value beyond which in the cable-attachment diagnostic operation, steering shaft angle sensor 2 is unable to perform measurement to bring variable steering ratio control mechanism 20 in a failure condition, or defined as a value beyond which the spiral cable for airbag is cut. FIGS. 18A and 18B are views showing examples of the maximum allowable steering shaft angle. FIG. 18A shows a case where (range of steering shaft angle for driver)<(measurable range of steering shaft angle sensor)<(range limited by airbag spiral cable). In this case, the maximum allowable steering shaft angle is set to the measurable range of steering shaft angle sensor. FIG. 18B shows a case where (range of steering shaft angle for driver) <(range limited by airbag spiral cable)<(measurable range of steering shaft angle sensor). In this case, the maximum allowable steering shaft angle is set to the range limited by airbag spiral cable. As mentioned above, the maximum allowable steering shaft angle is determined in accordance with the range limited by airbag spiral cable and the measurable range of steering shaft angle sensor. The maximum allowable steering shaft angle is represented by B.

The following discusses necessary conditions for the cable-attachment diagnostic operation. These conditions are summarized in the following two conditions.

(Condition 1) It is possible to steer over the range required to check in the cable-attachment diagnostic operation in consideration of variations between vehicles. In other words, it is possible to turn steering wheel 1 to maximum operating steering shaft angle A without interference of a spiral cable. If it is impossible to turn steering wheel 1 to maximum operating steering shaft angle A due to interference of a spiral cable, the cable-attachment diagnostic operation is not be completed.

(Condition 2) Steering shaft angle $\theta$ is changed within maximum allowable steering shaft angle B. If steering shaft angle $\theta$ exceeds maximum allowable steering shaft angle B, it is possible that a system failure occurs or an airbag spiral cable is ruptured, to adversely affect workability of the operation.

Figure 19:
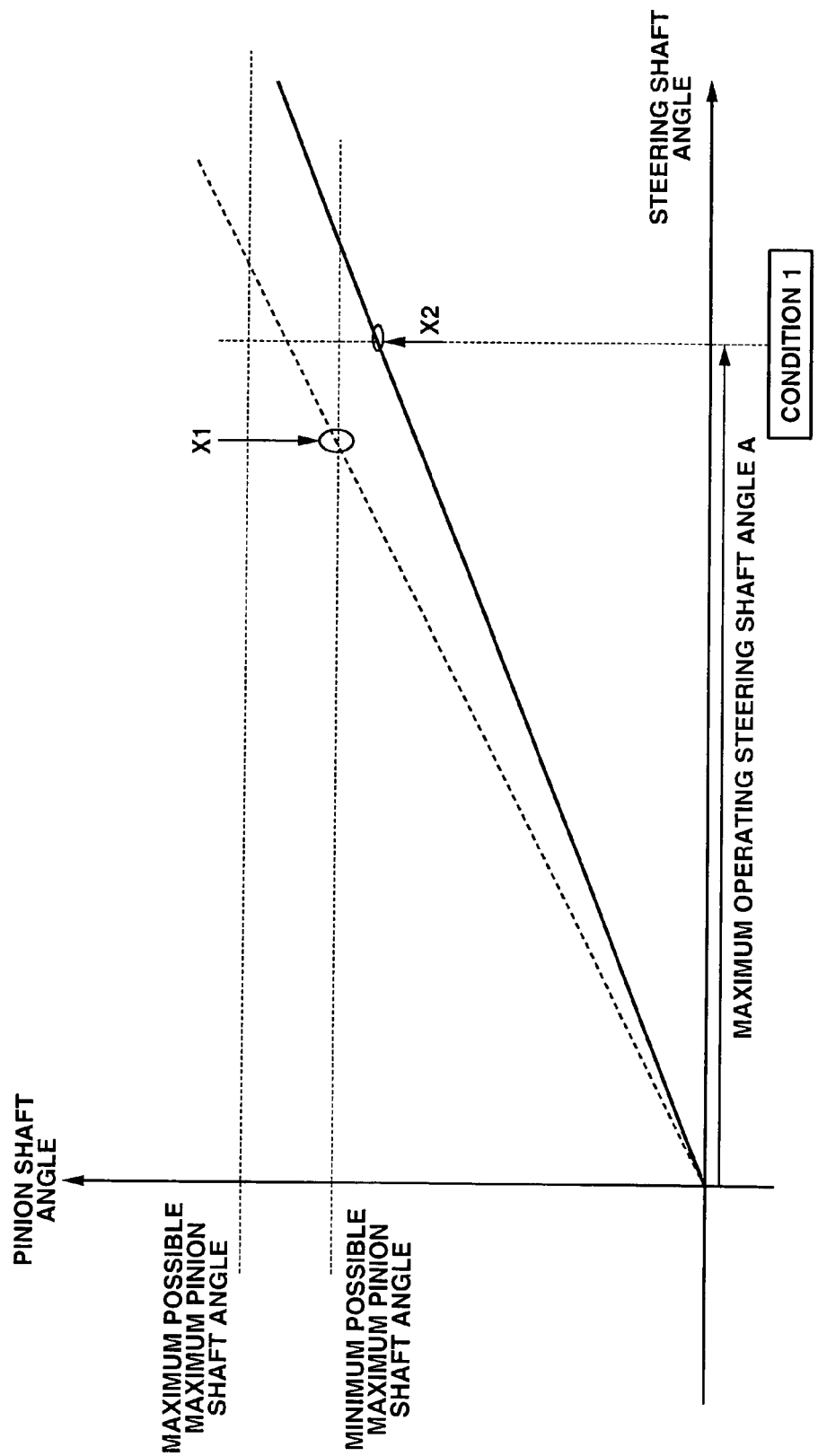
FIG. 19 is a view showing a first condition concerning a relationship between steering shaft angle $\theta$ and pinion shaft angle $\delta$ in a steering control apparatus in accordance with a fifth embodiment.

FIG. 19 is a view showing condition 1 concerning a relationship between steering shaft angle $\theta$ and pinion shaft angle $\delta$. When the cable-attachment diagnostic operation is performed using the steering ratio setting shown in the dotted line in FIG. 19 and the maximum pinion shaft angle is minimum possible maximum pinion shaft angle $\delta$min, rotation of steering shaft 3 is restricted by rack stoppers 50a, 50b within maximum operating steering shaft angle A, as shown in a region indicated by X1. Cable-attachment diagnostic operation section 10a does not distinguish the restriction due to rack stoppers 50a, 50b from the restriction due to incorrect attachment of spiral cable 21a, to correctly perform the cable-attachment diagnostic operation. Therefore, as shown in the solid line in FIG. 19 and a region indicated by X2, the steering ratio needs to be controlled in such a manner that the rotation of steering shaft 3 is not restricted by rack stoppers 50a, 50b within maximum operating steering shaft angle A even if the maximum pinion shaft angle is minimum possible maximum pinion shaft angle δmin.

Figure 20:
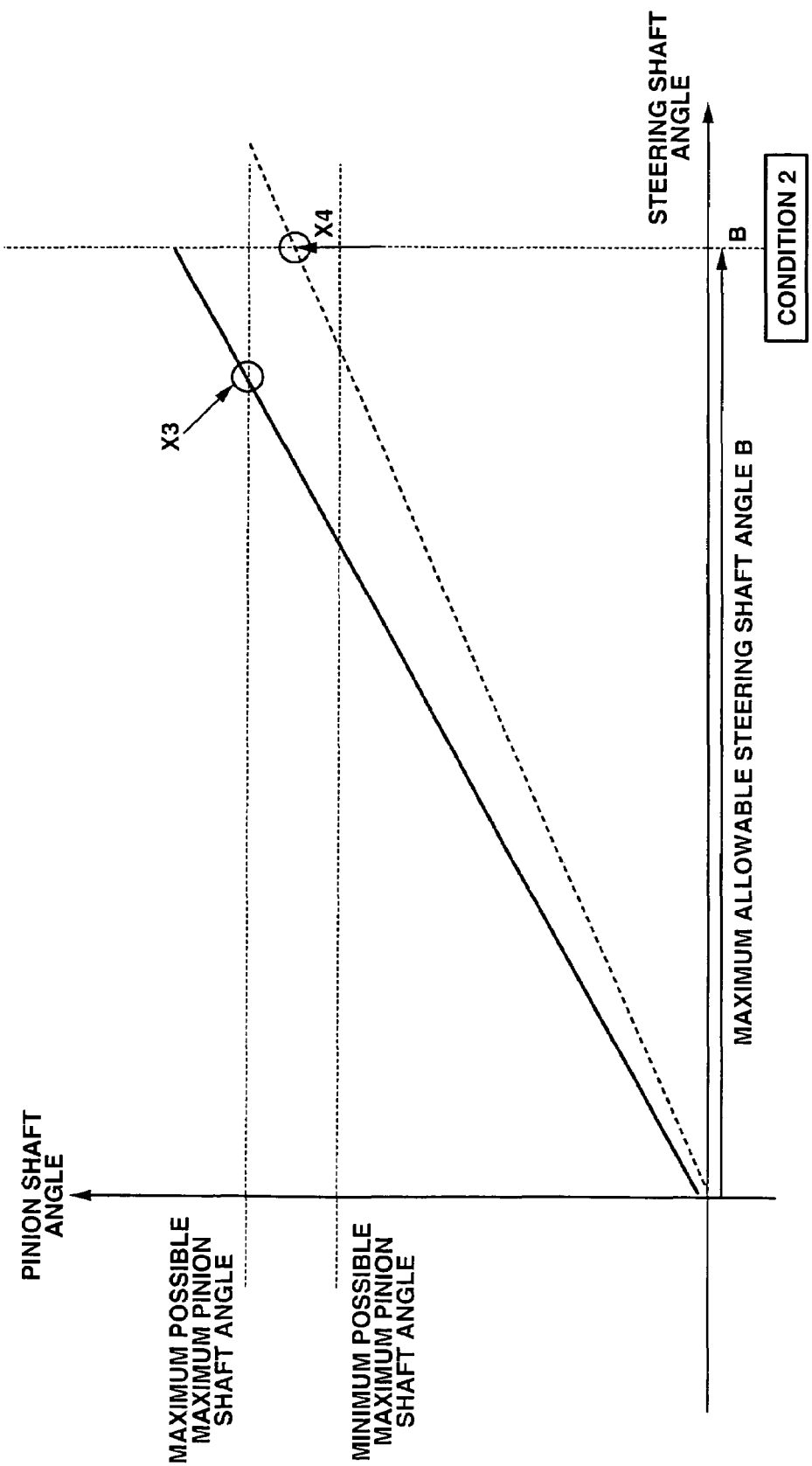
FIG. 20 is a view showing a second condition concerning a relationship between steering shaft angle $\theta$ and pinion shaft angle $\delta$ in the steering control apparatus of the fifth embodiment.

FIG. 20 is a view showing condition 2 concerning a relationship between steering shaft angle θ and pinion shaft angle δ. When the cable-attachment diagnostic operation is performed using the steering ratio setting shown in the dotted line in FIG. 20 and the maximum pinion shaft angle is maximum possible maximum pinion shaft angle δmax, the rotation of steering shaft 3 is not restricted by rack stoppers 50a, 50b within maximum allowable steering shaft angle B, as shown in a region indicated by X4. As a result, it is possible that a system failure occurs or an airbag spiral cable is ruptured. Therefore, as shown in the solid line in FIG. 20 and in a region indicated by X3, the steering ratio needs to be controlled in such a manner that the rotation of steering shaft 3 is restricted by rack stoppers 50a, 50b within maximum allowable steering shaft angle B even if the maximum pinion shaft angle is maximum possible maximum pinion shaft angle δmax.

Figure 21:
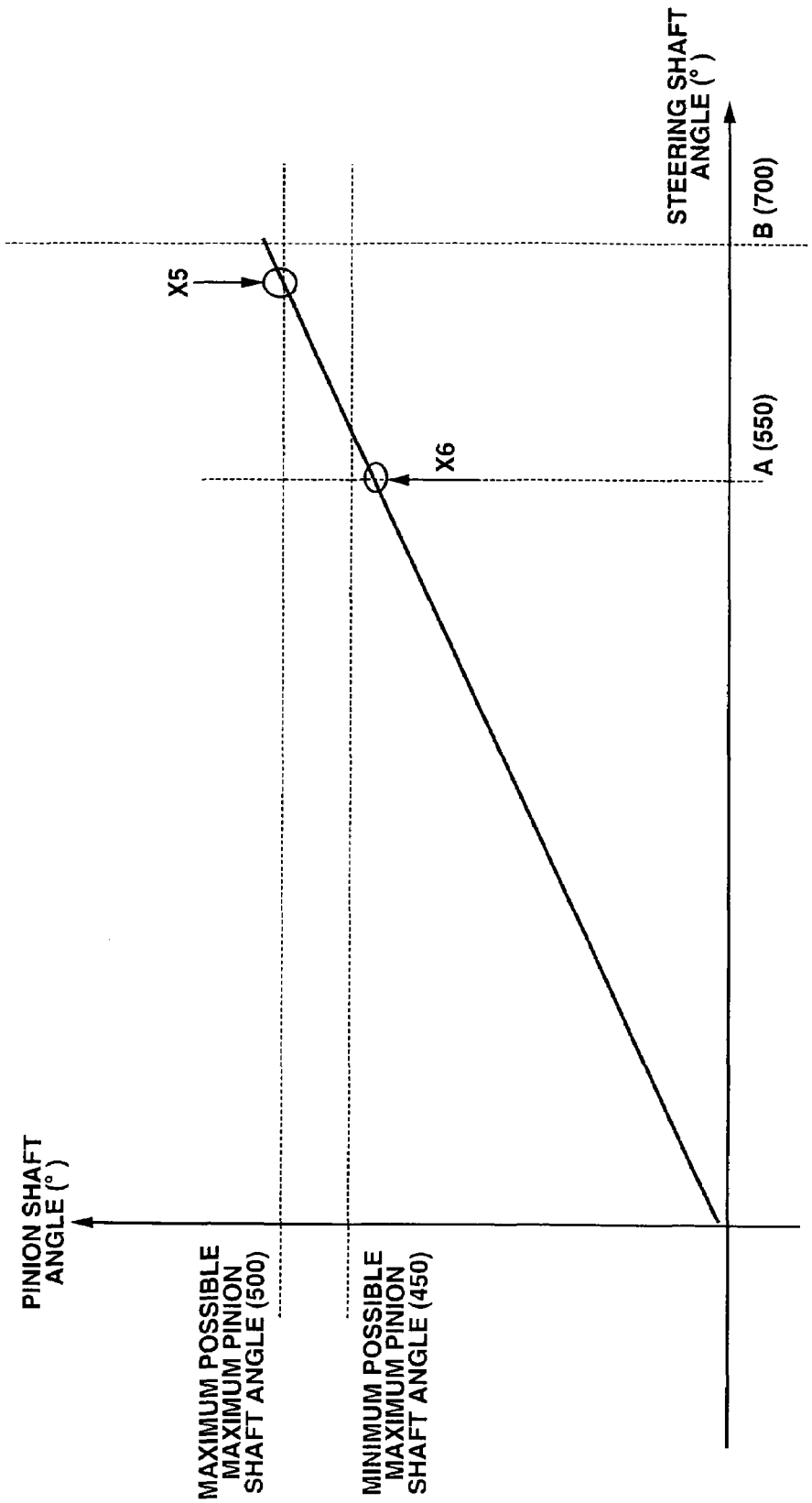
FIG. 21 is a view showing an example of the cable-attachment diagnostic operation in a vehicle where the maximum possible maximum pinion shaft angle, the minimum possible maximum pinion shaft angle, A, and B are 500°, 450°, 550°, and 700°, respectively, in the fifth embodiment.

The following describes specific examples concerning the above-discussed conditions 1 and 2. FIG. 21 is a view showing an example of the cable-attachment diagnostic operation in a vehicle where the maximum possible maximum pinion shaft angle, the minimum possible maximum pinion shaft angle, A, and B are 500°, 450°, 550°, and 700°, respectively. As shown in FIG. 21, a valid cable-attachment diagnostic operation is provided for this vehicle where the steering ratio is controlled to be a suitable constant value, to satisfy both of the conditions 1 and 2. While the rotation of steering shaft 3 is restricted by rack stoppers 50a, 50b within maximum allowable steering shaft angle B even if the maximum pinion shaft angle is maximum possible maximum pinion shaft angle δmax, the rotation of steering shaft 3 is not restricted by rack stoppers 50a, 50b within maximum operating steering shaft angle A even if the maximum pinion shaft angle is minimum possible maximum pinion shaft angle δmin, as shown in regions X5 and X6 in FIG. 21.

Figure 22:
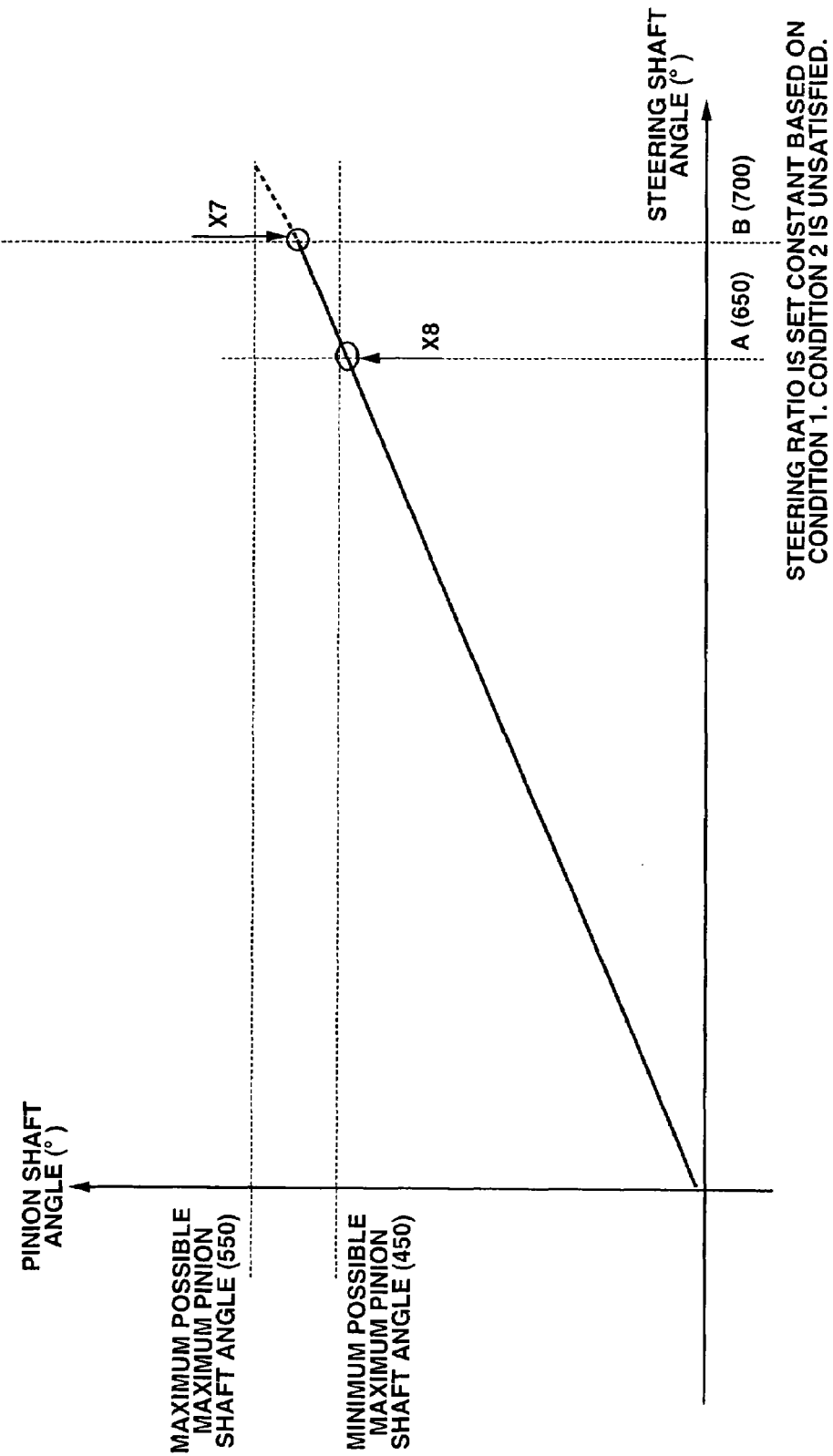
FIG. 22 is a view showing an example of the cable-attachment diagnostic operation in a vehicle where the maximum possible maximum pinion shaft angle, the minimum possible maximum pinion shaft angle, A, and B are 550°, 450°, 650°, and 700°, respectively, in the fifth embodiment.
Figure 23:
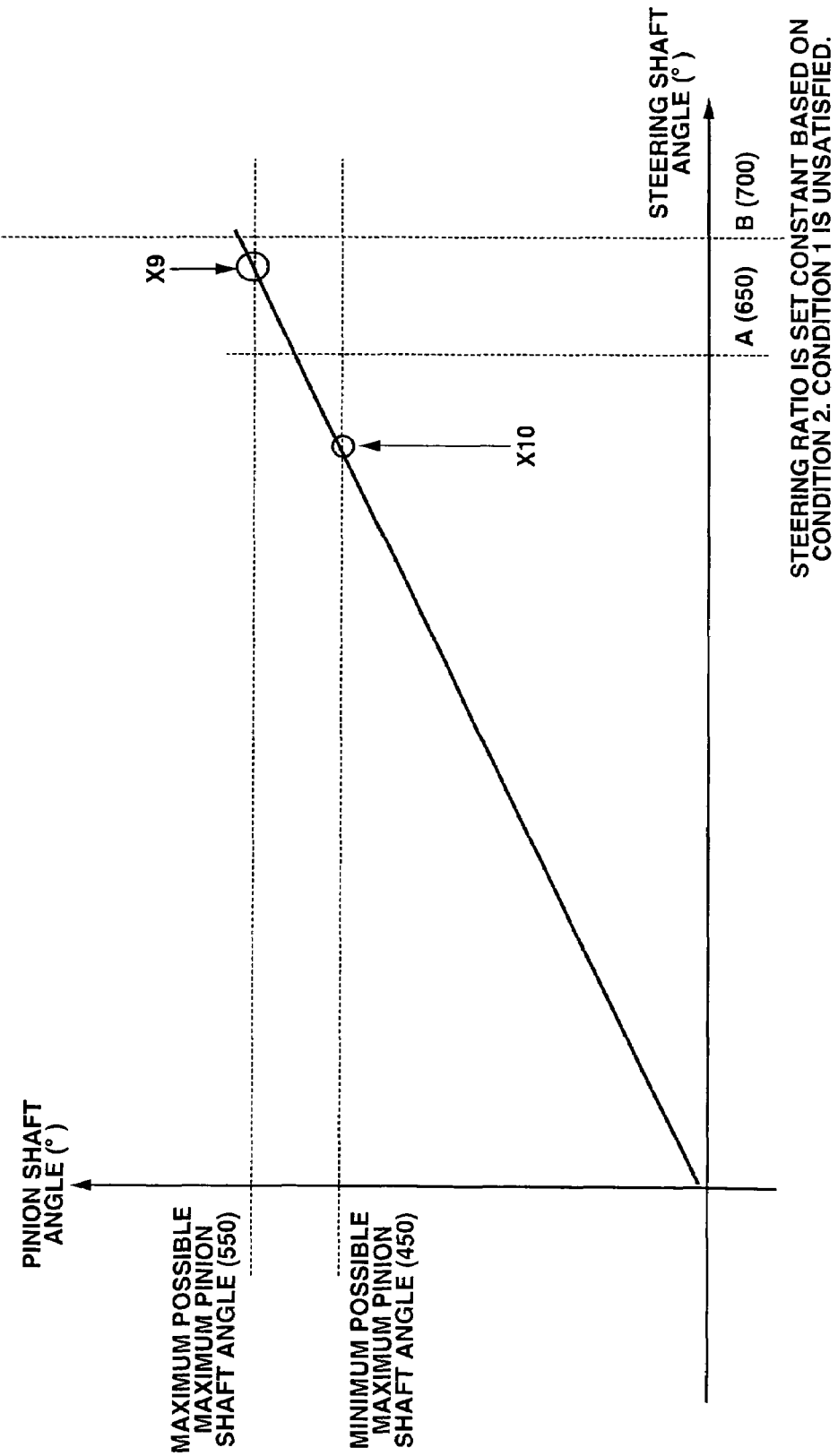
FIG. 23 is a view showing an example of the cable-attachment diagnostic operation in a vehicle where the maximum possible maximum pinion shaft angle, the minimum possible maximum pinion shaft angle, A, and B are 550°, 450°, 650°, and 700°, respectively, in the fifth embodiment.

However, there are cases where it is impossible to control the steering ratio to be a suitable constant value, to satisfy both of the conditions 1 and 2. FIGS. 22 and 23 are views showing an example of the cable-attachment diagnostic operation in a vehicle where the maximum possible maximum pinion shaft angle, the minimum possible maximum pinion shaft angle, A, and B are 550°, 450°, 650°, and 700°, respectively. As shown in FIG. 22, if the steering ratio is controlled to be a constant value so that the rotation of steering shaft 3 is not restricted by rack stoppers 50a, 50b within maximum operating steering shaft angle A even if the maximum pinion shaft angle is minimum possible maximum pinion shaft angle δmin, in order to satisfy condition 1, as shown in a region X8, but if the maximum pinion shaft angle is actually maximum possible maximum pinion shaft angle δmax, the rotation of steering shaft 3 is not restricted by rack stoppers 50a, 50bwithin maximum allowable steering shaft angle B, not to satisfy condition 2, as shown in a region X7. On the other hand, as shown in FIG. 23, if the steering ratio is controlled to be a constant value so that the rotation of steering shaft 3 is restricted by rack stoppers 50a, 50b within maximum allowable steering shaft angle B even if the maximum pinion shaft angle is maximum possible maximum pinion shaft angle δmax, in order to satisfy condition 2, as shown in a region X9, but if the maximum pinion shaft angle is actually minimum possible maximum pinion shaft angle δmin, the rotation of steering shaft 3 is restricted by rack stoppers 50a, 50b within maximum operating steering shaft angle A, not to satisfy condition 1, as shown in a region X10.

In the fifth embodiment, the above-mentioned subject is solved by controlling the steering ratio to two different steering ratio settings over the range from the neutral position to maximum operating steering shaft angle A, and over the range from maximum operating steering shaft angle A to maximum allowable steering shaft angle B.

Figure 24:
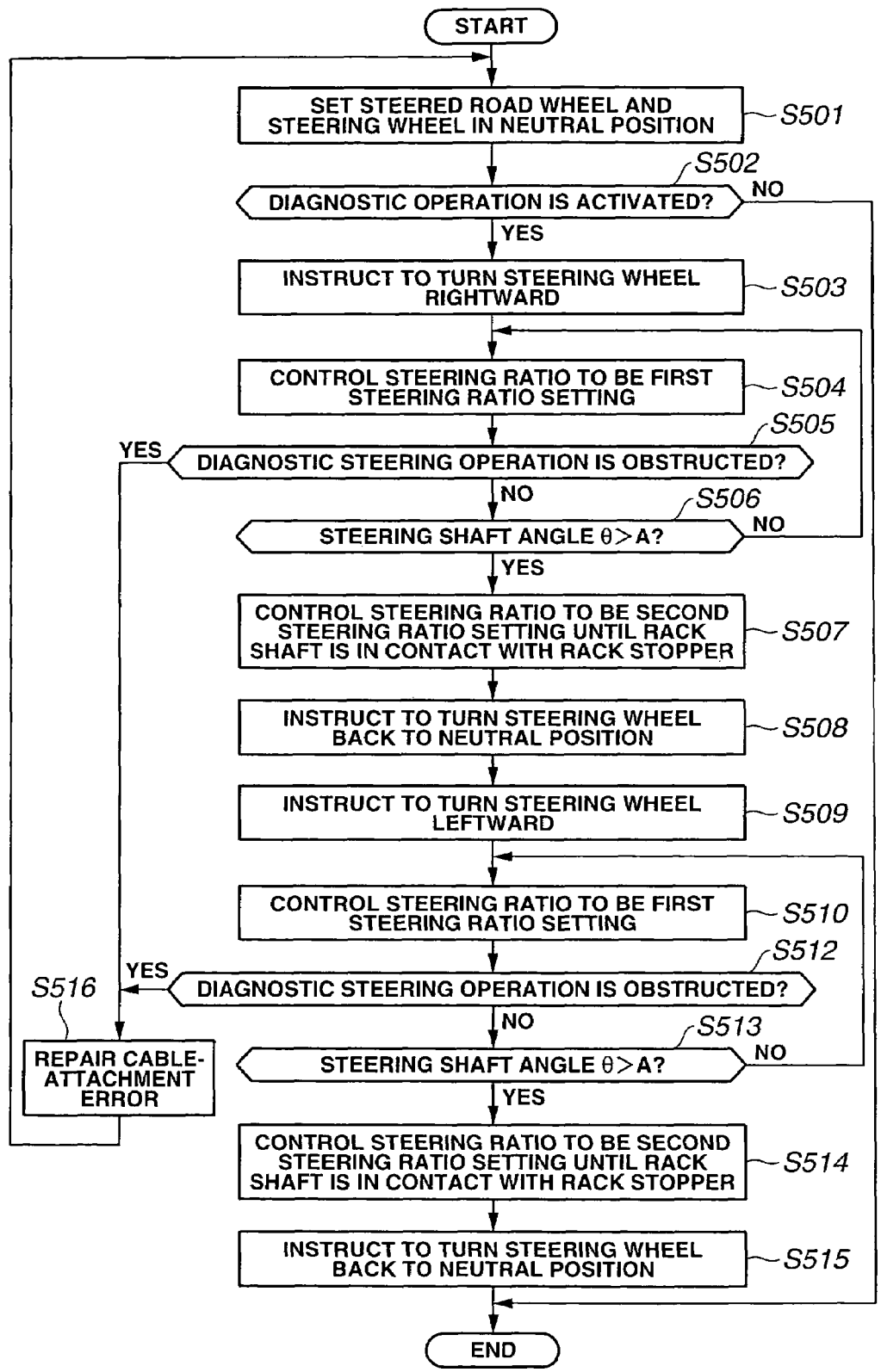
FIG. 24 is a flow chart showing a cable-attachment diagnostic operation to be performed by a cable-attachment diagnostic operation section 10a in accordance with the fifth embodiment.

The following describes a cable-attachment diagnostic operation for spiral cable 21a to be performed by cable-attachment diagnostic operation section 10a in accordance with the fifth embodiment. The cable-attachment diagnostic operation is basically performed in an assembly plant for automotive vehicles, or in a repair shop, etc. Before performing the cable-attachment diagnostic operation, variable steering ratio control mechanism 20 and steering shaft angle sensor 2 are installed to the vehicle, and the sensors are initialized. FIG. 24 is a flow chart showing the cable-attachment diagnostic operation to be performed by cable-attachment diagnostic operation section 10a. Suppose the cable-attachment diagnostic operation of the fifth embodiment is applied to a specific vehicle where the maximum possible maximum pinion shaft angle, the minimum possible maximum pinion shaft angle, A, and B are 550°, 450°, 650°, and 700°, respectively.

At step S501, cable-attachment diagnostic operation section 10a neutralizes steerable wheel 8 and steering wheel 1.

Subsequent to step S501, at step S502, cable-attachment diagnostic operation section 10a determines whether or not to perform the cable-attachment diagnostic operation, by checking the activation signal from diagnostic operation activation unit 11. When the answer to step S502 is YES, the routine proceeds to step S503. On the other hand, when the answer to step S502 is NO, the routine returns.

At step S503, cable-attachment diagnostic operation section 10a instructs an operator to turn steering wheel 1 (steering shaft 3) rightward. When a required procedure is presented to the operator beforehand, it is not necessary to issue the instruction. It is optional to turn steering wheel 1 by means of EPS 30 as in the fourth embodiment.

At step S504, cable-attachment diagnostic operation section 10a controls the steering ratio to be a first steering ratio setting such that the rotation of steering shaft 3 is not restricted by rack stoppers 50a, 50b within maximum operating steering shaft angle A even if the maximum pinion shaft angle is minimum possible maximum pinion shaft angle δmin. Accordingly, the first steering ratio setting is set lower than (δmin/A). Specifically, the first steering ratio setting is set to (440°/A) with a margin.

Subsequent to step S504, at step S505, cable-attachment diagnostic operation section 10a determines whether or not the diagnostic steering operation is obstructed, or whether or not the rotation of steering wheel 1 is restricted by spiral cable 21a. When the answer to step S505 is YES, the routine proceeds to step S516. On the other hand, when the answer to step S505 is NO, the routine proceeds to step S506. operation section 10a determines whether steering shaft At step S506, cable-attachment diagnostic angle θ is larger than maximum operating steering shaft angle A. When the answer to step S506 is YES, the routine proceeds to step S507. On the other hand, when the answer to step S506 is NO, the routine proceeds back to step S504. Thus, steps S504 through S506 are repeatedly executed until one of the condition of step S505 and the condition of step S506 is satisfied.

At step S507, cable-attachment diagnostic operation section 10a controls the steering ratio to be a second steering ratio setting until the rotation of steering wheel 1 is restricted by rack stoppers 50a, 50b or until rack shaft 7 is in contact with rack stoppers 50a, 50b. The second steering ratio setting is such that the rotation of steering shaft 3 is restricted by rack stoppers 50a, 50b within maximum allowable steering shaft angle B even if the maximum pinion shaft angle is maximum possible maximum pinion shaft angle δmax. Accordingly, the second steering ratio setting is set so that if steering shaft angle θ reaches maximum allowable steering shaft angle B (=700°) pinion shaft angle δ exceeds maximum possible maximum pinion shaft angle δmax after steering shaft angle θ is changed to maximum operating steering shaft angle A with the first steering ratio setting. That is, the second steering ratio setting is determined by connecting the point where pinion shaft angle δ is larger than maximum possible maximum pinion shaft angle δmax when steering shaft angle θ is maximum allowable steering shaft angle B and the point where pinion shaft angle δ is controlled with the steering ratio being the first steering ratio setting to be smaller than minimum possible maximum pinion shaft angle δmin when steering shaft angle θ is maximum operating steering shaft angle A. For example, when pinion shaft angle δ is set to 560° when steering shaft angle θ is B, the second steering ratio setting is set so that the relationship between steering shaft angle θ and pinion shaft angle δ is expressed by the following equation.

$$\delta = \{(560° - 440°)/(700° - 650°)\} \cdot \theta - 1120°$$

Subsequent to step S507, at step S508, cable-attachment diagnostic operation section 10a instructs to turn steering wheel 1 (steering shaft 3) back to its neutral position after the rotation of steering wheel 1 is restricted by rack stoppers 50a, 50b. When returning to the neutral position, the steering ratio is controlled to be the second steering ratio setting until steering shaft angle θ reaches A, and to be the first steering ratio setting during steering shaft angle θ changes from A to the neutral position, so as not to deviate the neutral position of steering shaft angle θ.

At steps S509 through S515, the same routine as at steps S503 through S508 is performed swapping the rightward elements and the leftward elements.

Figure 25:
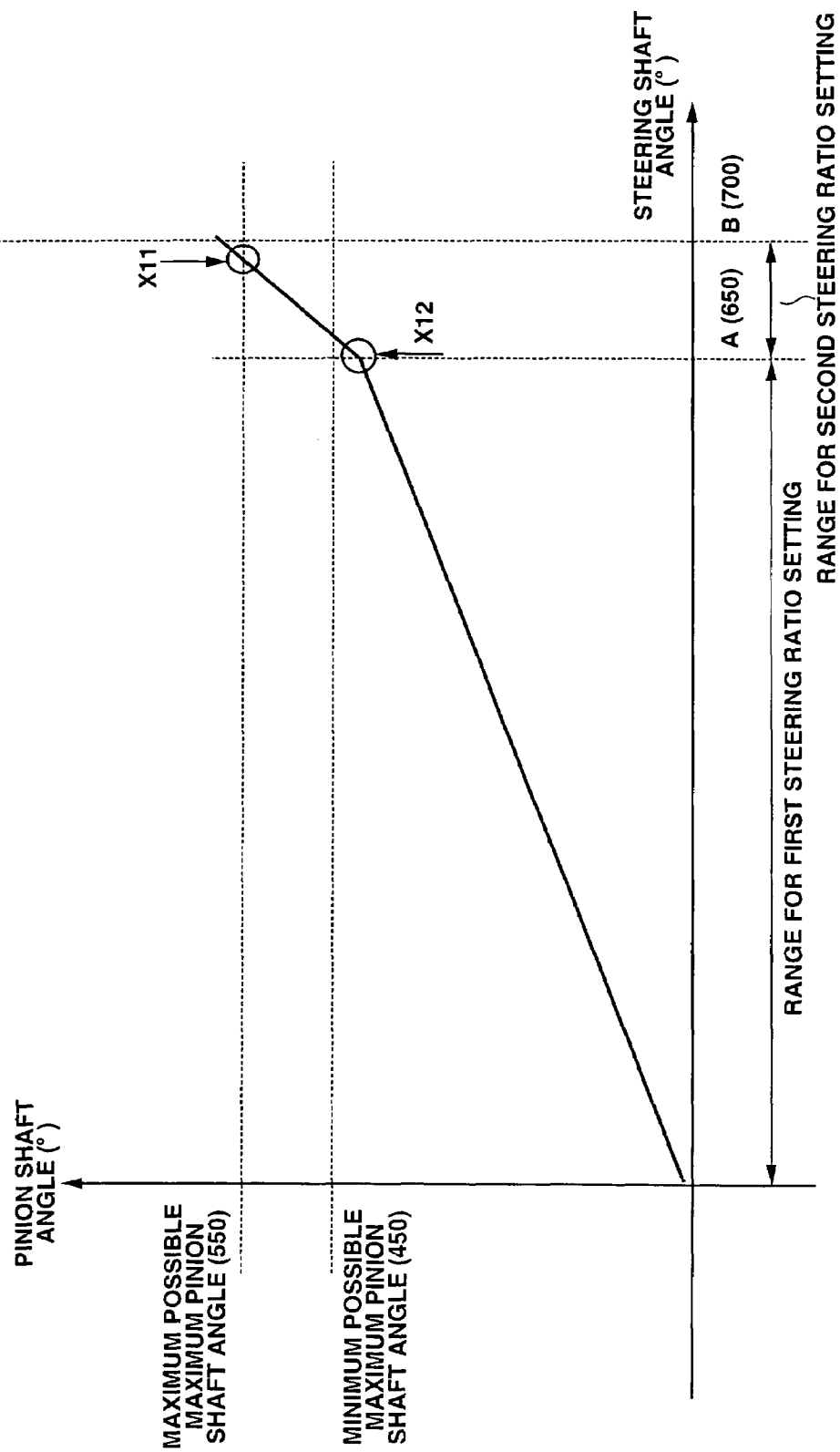
FIG. 25 is a view showing a relationship between steering shaft angle $\theta$ and pinion shaft angle $\delta$ in the cable-attachment diagnostic operation in accordance with the fifth embodiment.

FIG. 25 is a view showing a relationship between steering shaft angle θ and pinion shaft angle δ in the cable-attachment diagnostic operation in accordance with the fifth embodiment. As shown in FIG. 25, the steering ratio is controlled to be the first steering ratio setting over the region from the neutral position to maximum operating steering shaft angle A, and to be the second steering ratio setting over the region from maximum operating steering shaft angle A to maximum allowable steering shaft angle B. Thus, the condition 1 is satisfied when steering shaft angle θ is A, as shown in a region X12, and the condition 2 is satisfied after steering shaft angle θ exceeds A and before steering shaft angle θ reaches B, as shown in a region X11. As a result, the cable-attachment diagnostic operation is reliably completed, to prevent that a system failure occurs or an airbag spiral cable is ruptured.

The steering control apparatus of the fifth embodiment as mentioned above produces the following operation effects and advantages. (6) The steering control apparatus configured to control the steering ratio to be the first steering ratio setting lower than the minimum steering ratio setting or lower than 1 until steering shaft angle θ reaches maximum operating steering shaft angle A, so that pinion shaft angle δ is smaller than minimum possible maximum pinion shaft angle δmin when steering shaft angle θ is maximum operating steering shaft angle A, and to stop the rotation of steering wheel 1 by rack stoppers 50a, 50b when steering shaft angle θ exceeds maximum operating steering shaft angle A, is effective for enabling steering over the range required to check in the cable-attachment diagnostic operation in consideration of variations between vehicles. Although the rotation of steering shaft 3 is restricted by rack stoppers 50a, 50b in the fifth embodiment, the rotation of steering shaft 3 may be limited by emitting a warning sound based on the signal of steering shaft angle sensor 2 when steering shaft angle δ exceeds a predetermined steering shaft angle, or may be limited by operating EPS 30 to generate a feedback force when EPS 30 is provided. (7) The steering control apparatus configured to control the steering ratio so that the rotation of steering shaft 3 is restricted by rack stoppers 50a, 50b from maximum operating steering shaft angle A to maximum allowable steering shaft angle B, is effective for regulating steering shaft angle θ within maximum allowable steering shaft angle B, to prevent that a system failure occurs or an airbag spiral cable is ruptured, to improve workability of the operation. (8) The steering control apparatus configured to control the steering ratio to the second steering ratio setting lower than 1, so that pinion shaft angle δ is larger than maximum possible maximum pinion shaft angle δmax when steering shaft angle θ is maximum allowable steering shaft angle B wherein the rotation of steering shaft 3 is restricted by rack stoppers 50a, 50b, is effective for stopping the rotation of steering shaft 3 from maximum operating steering shaft angle A to maximum allowable steering shaft angle B, to reliably prevent that a system failure occurs or an airbag spiral cable is ruptured.

The following describes a steering control apparatus in accordance with a sixth embodiment. Although, as shown in FIG. 18A, the steering control apparatus of the fifth embodiment determines maximum allowable steering shaft angle B based on the measurable range of steering shaft angle sensor 2 beyond which it is determined that a failure occurs, maximum allowable steering shaft angle B is increased to the limit due to the spiral cable attachment, in the sixth embodiment. In general, a typical variable steering ratio control mechanism configured to use data from a steering shaft angle sensor includes a sensor-failure handling logic of shutting down the system based on the determination that there is a failure in steering shaft angle sensor 2 when the data value from steering shaft angle sensor 2 exceeds a predetermined threshold. If this logic is canceled in the cable-attachment diagnostic operation, it is possible to extend maximum allowable steering shaft angle B. When steering wheel 1 is not directly restricted by a stopper, and maximum allowable steering shaft angle B is determined by the steering ratio and rack stoppers 50a, 50b, it is possible to increase maximum allowable steering shaft angle B within a range where an airbag spiral cable is not ruptured. In general, the above-mentioned predetermined threshold of the sensor-failure handling logic is determined in accordance with the structure of steering shaft angle sensor 2, indicating the upper limit of the range correctly measurable. For example, suppose that the maximum of the measurable range of steering shaft angle sensor 2 is 700° and the point of cutting the airbag spiral cable is 750°. With the above-mentioned logic being canceled, maximum allowable steering shaft angle B is increased from 700° to 750°, to enhance the flexibility of steering system design.

The cable-attachment diagnostic operation of the sixth embodiment is constructed by modifying steps S502 and S507 in the flow chart of FIG. 24 of the fifth embodiment. Specifically, at modified step S502, when it is determined to perform the cable-attachment diagnostic operation, cable-attachment diagnostic operation section 10a issues a command to assist control unit 10 to cancel the sensor-failure handling logic. At modified step S507, the second steering ratio setting is calculated in accordance with the extended maximum allowable steering shaft angle B.

The steering control apparatus of the sixth embodiment produces the following operation effects and advantages. (9) The steering control apparatus configured to cancel the sensor-failure handling logic in the cable-attachment diagnostic operation to increase maximum allowable steering shaft angle B, is effective for expanding the scope of vehicle types where the cable-attachment diagnostic operation is performed by simply setting only the first steering ratio setting.

Referring now to FIGS. 26 through 32, there is shown a steering control apparatus in accordance with a seventh embodiment. The steering control apparatus of the seventh embodiment is constructed basically as that of the fifth embodiment.

Figure 26:
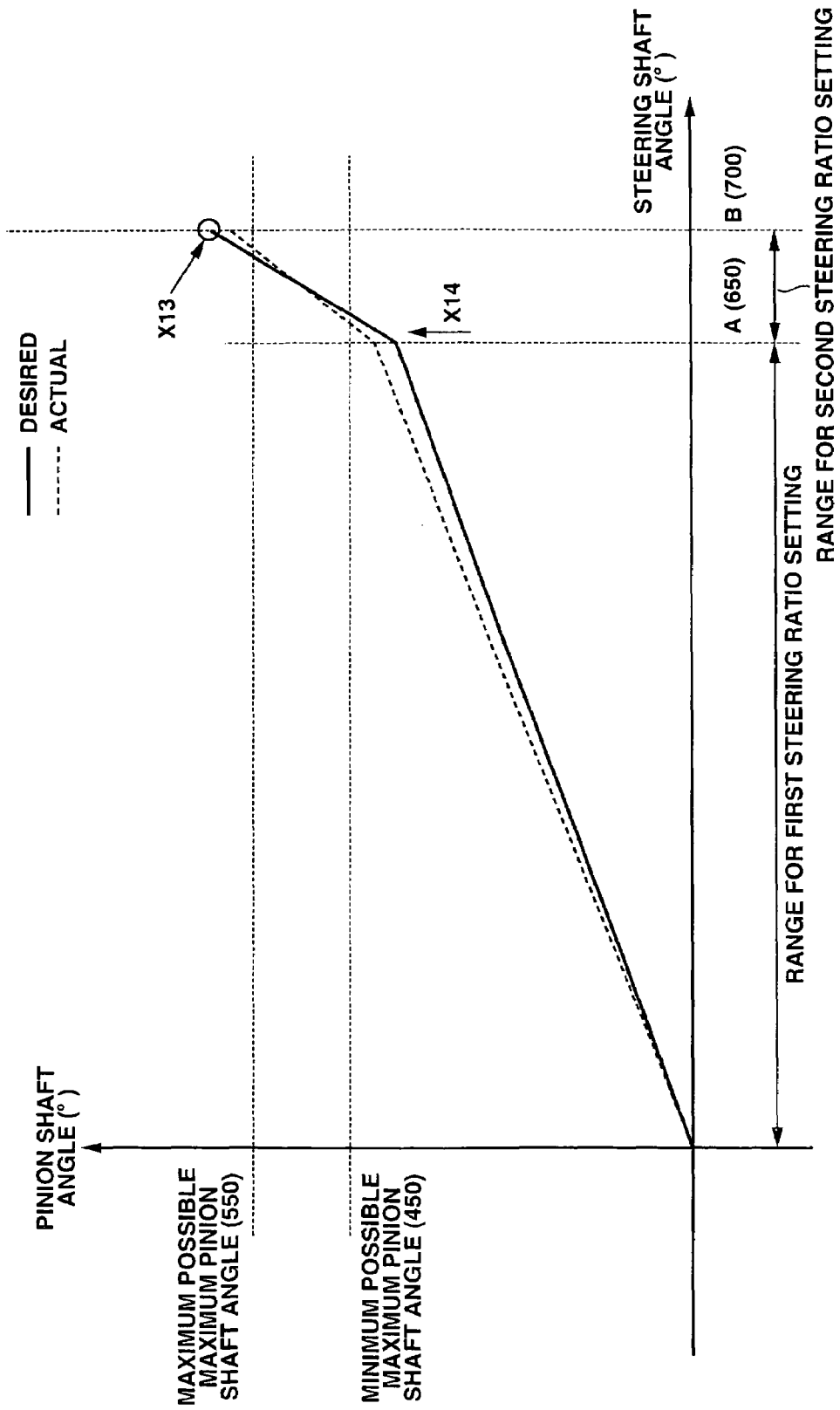
FIG. 26 is a view showing a relationship between steering shaft angle $\theta$ and pinion shaft angle $\delta$ under influence of a response delay between a command and an actual rotation of the electric motor of variable steering ratio control mechanism 20.

The following discusses response delay in the cable-attachment diagnostic operation. In general, a motor is driven by a control command from a control section. The actual output of the motor is delayed in response with respect to the control command, due to performance of the motor, such as responsivity of the motor, and the speed-torque characteristic of the motor. If the steering ratio command from assist control unit 10 to electric motor 20a of variable steering ratio control mechanism 20 is set with no margin in such a manner as to satisfy the necessary conditions 1 and 2 as discussed in the fifth embodiment, it is possible that the cable-attachment diagnostic operation is incorrectly performed due to the response delay. FIG. 26 is a view showing a relationship between steering shaft angle $\theta$ and pinion shaft angle $\delta$ under influence of a response delay between a command and an actual rotation of the motor of variable steering ratio control mechanism 20. As shown in FIG. 26, in the region of the first steering ratio setting where the steering ratio is controlled to be lower than 1, the speed reduction control is performed by means of electric motor 20a. Even when the command value is output as shown by a solid line in FIG. 26 in the region of the first steering ratio setting, the speed reduction control is delayed due to the response delay of electric motor 20a, so that the actual pinion shaft angle is larger than the command as shown by a dotted line in FIG. 26, as shown in a region X14. On the other hand, when the steering ratio is controlled to be large in the region of the second steering ratio setting, and the speed increase is performed by means of electric motor 20a. Even when the command value is output as shown by a solid line in FIG. 26 in the region of the second steering ratio setting, the speed increase control is delayed due to the response delay of electric motor 20a, so that the actual pinion shaft angle is smaller than the command as shown by a dotted line in FIG. 26, as shown in a region X13. Therefore, it is necessary to control the steering ratio ensuring a margin for the response delay of the motor.

As mentioned above, variable steering ratio control mechanism 20 switches the control mode from the speed reduction control to the speed increase control when steering shaft angle $\theta$ is maximum operating steering shaft angle A. At the time, the rotation of electric motor 20a is reversed at a stretch. Although electric motor 20a continues to move in the direction of the speed reduction by the law of inertia at the switching point, the command value to electric motor 20a is already reversed. Accordingly, the moving direction of electric motor 20a is different from the direction of the output based on the command. Assist control unit 10 includes a logic handling a motor failure, which suspends the system to reduce the load to electric motor 20a when the motor current command is large in the direction opposite to the actual moving direction of electric motor 20a. When the motor load is high in the system including the motor failure handling logic, it is possible that electric motor 20a is not desirably driven as a command value due to a system suspension. Usually, the motor failure handling logic is activated and operated more frequently with an increase in the change in the motor current command. Specifically, when the current command is issued larger than a predetermined threshold such as a nominal value in the direction opposite to the drive direction of electric motor 20a, the motor failure handling logic suspends the system.

Figure 27:
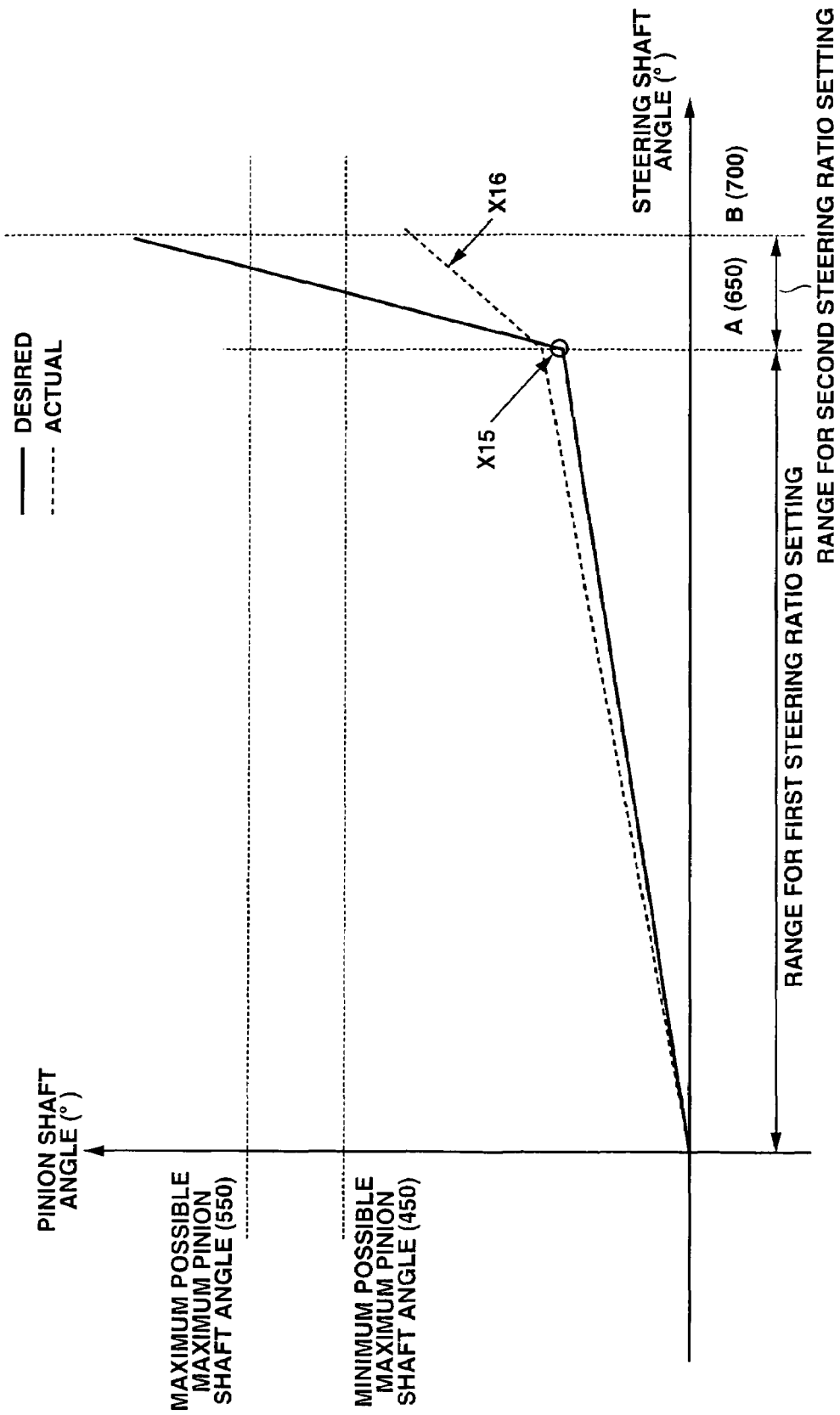
FIG. 27 is a view showing a relationship between steering shaft angle $\theta$ and pinion shaft angle $\delta$ when the direction of the command issued is different from the actual direction of rotation in electric motor 20a so that variable steering ratio control mechanism 20 is suspended.
Figure 28:
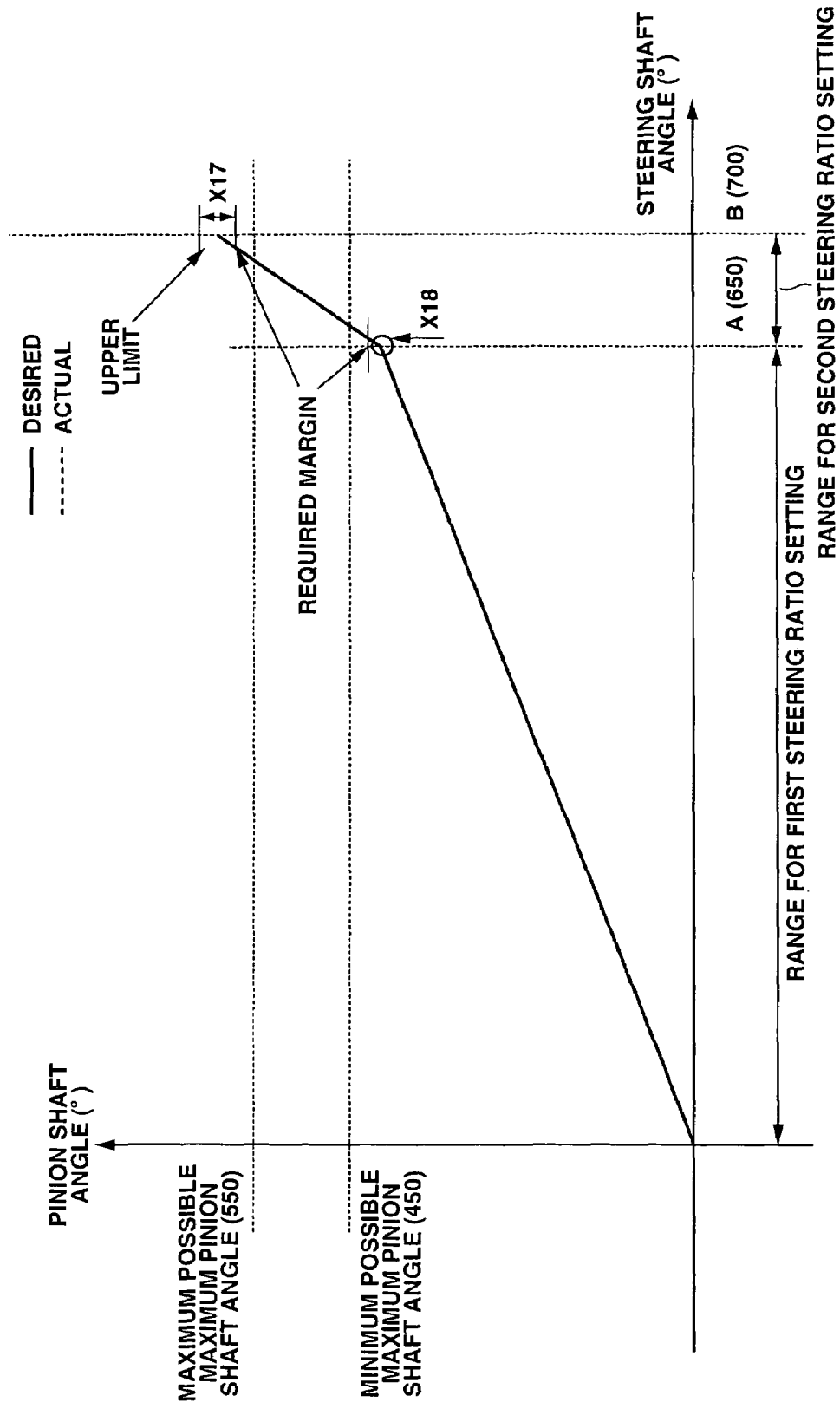
FIG. 28 is a view showing a relationship between steering shaft angle $\theta$ and pinion shaft angle $\delta$ when the amount of change from a first steering ratio setting to a second steering ratio setting is limited in accordance with a seventh embodiment.

Suppose that assist control unit 10 issues a command to electric motor 20a, securing an excessive margin for the response delay of electric motor 20a. At the point the steering ratio is changed from the first steering ratio setting to the second steering ratio setting, the command value to the motor changes abruptly to a counter direction. At this time, the deviation between the command and the actual motor position increases, to increase the current command value proportional to the amount of the deviation in general. Accordingly, the motor failure handling logic is operated to suspend the system, since the current command is larger than a predetermined threshold. FIG. 27 is a view showing a relationship between steering shaft angle $\theta$ and pinion shaft angle $\delta$ when the direction of the command issued is different from the actual direction of rotation in electric motor 20a so that variable steering ratio control mechanism 20 is suspended. As shown in FIG. 27, when the motor command is abruptly changed to suspend the system at maximum operating steering shaft angle A, the steering ratio is set to 1 as in the case of a conventional mechanical steering system, as shown in a region X15. As a result, pinion shaft angle $\delta$ does not desirably increase with an increase in steering shaft angle $\theta$, so that steering shaft angle $\theta$ exceeds maximum allowable steering shaft angle B before pinion shaft angle $\delta$ reaches maximum possible maximum pinion shaft angle $\delta$max, as shown in a region X16. Thus, the cable-attachment diagnostic operation section 10a is incorrectly performed. From the above-mentioned viewpoint, in the seventh embodiment, the motor current command is limited to be smaller than a predetermined threshold by limiting the amount of change in the motor current at the time the direction of rotation of electric motor 20a is changed, in other words, by limiting the deviation so that the rate of change is lower than a predetermined threshold. FIG. 28 is a view showing a relationship between steering shaft angle $\theta$ and pinion shaft angle $\delta$ when the amount of change from the first steering ratio setting to the second steering ratio setting is limited. As shown in FIG. 28, the first steering ratio setting is set so that pinion shaft angle $\delta$ is smaller by a required margin than minimum possible maximum pinion shaft angle $\delta$min when steering shaft angle $\theta$ is A. On the other hand, the second steering ratio setting is set so that pinion shaft angle $\delta$ is larger by a required margin than maximum possible maximum pinion shaft angle $\delta$max and smaller than an upper limit above which the change in the motor command is large to suspend the system at A, when steering shaft angle $\theta$ is B. As a result, the cable-attachment diagnostic operation is stably performed without the motor failure logic operating.

The following discusses a specific example where maximum of the steering speed of the operator under cable-attachment diagnostic operation is assumed to be 500°/second. Electric motor 20a is assumed to change the drive direction 0.03 second after the command value changes in direction. In this case, if the control is designed in such a manner that electric motor 20a is required to output a speed of 1000°/second or more in the range from maximum operating steering shaft angle A to maximum allowable steering shaft angle B, the deviation is generated lager than the threshold so that the motor failure handling logic operates to suspend the system. Accordingly, in the case of the above-mentioned example, it is necessary to design the control system so that the rotation of the motor from maximum operating steering shaft angle A to maximum allowable steering shaft angle B is smaller than or equal to 100°. For example, the first steering ratio setting is set in such a manner to connect the origin point and the point (A(650), 435) where pinion shaft angle δ is 435° by ensuring a margin of 15° with respect to δmin when steering shaft angle θ is A, as shown in a region X18. The second steering ratio setting is set in such a manner as to connect that point and the point where pinion shaft angle δ is smaller than 585° (=435°+100°+50°) when steering shaft angle θ is B, as shown in a region X17.

Figure 29:
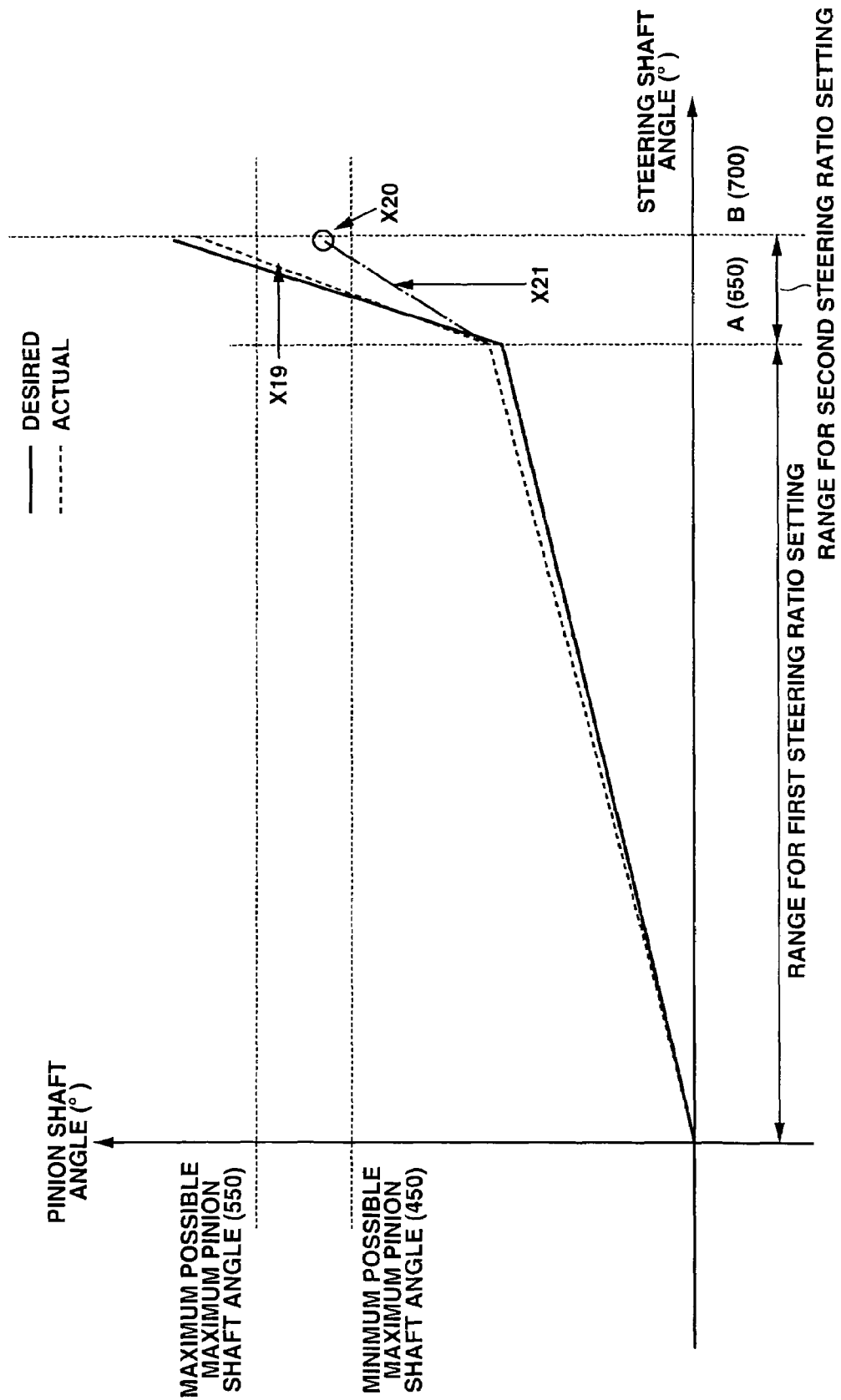
FIG. 29 is a view showing a relationship between steering shaft angle θ and pinion shaft angle δ when operator's steering speed is limited in consideration of maximum allowable speed of the electric motor in the seventh embodiment.

The following discusses an upper limit for motor speed. In general, a motor has an upper limit in its rotational speed due to its performance, such as its responsivity, and its speed-to-torque characteristic. Accordingly, if the rotation of electric motor 20a in the range of A to B is set to be large, it is necessary to limit the operator's steering speed, so that the required time for the cable-attachment diagnostic operation increases. FIG. 29 is a view showing a relationship between steering shaft angle θ and pinion shaft angle δ when operator's steering speed is limited in consideration of the maximum allowable speed of the electric motor in the seventh embodiment. In case the operator's steering speed is limited in the region where steering shaft angle θ exceeds maximum operating steering shaft angle A, the actual value of pinion shaft angle δ as shown by a dotted line follows with little deviation the command value as shown by a solid line, as shown in a region X19. On the other hand, in case the operator's steering speed is not limited, the actual value of pinion shaft angle δ as shown by a dashed dotted line does not follow the command value. As a result, it is possible that steering shaft angle θ exceeds maximum allowable steering shaft angle B before the steering is restricted by rack stoppers 50a, 50b, so that the failure handling logic suspends the system or the airbag spiral cable is broken, as shown in regions X20 and X21. Suppose the maximum speed of electric motor 20a of the seventh embodiment is 800°/second. FIG. 30 is a view showing a relationship among a maximum available motor rotation from A to B, an upper limit for operator's steering speed as an operator's rate of change in steering shaft angle, and a minimum overall operation time for the cable-attachment diagnostic operation. Since steering wheel 1 is turned right and left at least over 2600° (=650°×4) in the cable-attachment diagnostic operation, the minimum overall operation time is the value produced by dividing 2600° (=650°×4) by the limit for steering shaft angle rate of operator. For example, when the upper limit of the operator's steering speed is about from 400°/second to 500°/second, the second steering ratio setting set so that the amount of rotation of the motor from A (650°) to B (700°) is about from 80° to 100°. In the seventh embodiment, the operator's maximum steering speed is assumed to be 400°/second. Specifically, the second steering ratio setting is determined ensuring a margin for the steady state error of the motor so that pinion shaft angle δ is 560° when steering shaft angle θ is maximum allowable steering shaft angle B, and so that pinion shaft angle δ is 430° (=560°−80° (the amount of rotation by the motor from A to B)−50° (the amount of rotation by steering shaft 3 from A to B)). On the other hand, the first steering ratio setting is determined by connecting the origin point (steering shaft angle 0, pinion shaft angle 0) and the point of (B (650°), 430°) with a straight line. As a result, it is unnecessary for the operator to care about the steering speed during the operation, and the time required for incorrect attachment detection is reduced.

Although the second steering ratio setting is determined first in the seventh embodiment, it is optional to determine the first steering ratio setting prior to the second steering ratio setting in case the requirement to the motor is severer, namely, in case the amount of rotation of the motor per unit steering shaft angle is larger. In other words, the steering control apparatus may be configured to set the second steering ratio setting in such a manner that a load of the steering ratio control unit is lower than or equal to a predetermined threshold, and to set the first steering ratio setting in accordance with the second steering ratio setting. Suppose maximum possible maximum pinion shaft angle δmax is 500°, minimum possible maximum pinion shaft angle δmin is 350°, A is 500°, and B is 700°. In this case, while the motor is turned more than 150° from its neutral position to A (500°), it is unnecessary to drive the motor from A to B. In general, if the amount of rotation of the motor is set to 200° from the neutral position to A, the necessary condition 2 is automatically satisfied by stopping the motor. Accordingly, in this case, the requirement to the motor is severer for the first steering ratio setting than for the second steering ratio setting. Hence, the first steering ratio setting is first determined in accordance with the limit for the operator's steering speed and the motor performance, and then the second steering ratio setting is determined in accordance with the first steering ratio setting.

As discussed above, the steering control apparatus of the seventh embodiment produces the following operation effects and advantages. (10) The steering control apparatus configured to set the first and second steering ratio settings so that the rate of change in the steering ratio in transition from the first steering ratio setting to the second steering ratio setting is lower than or equal to a predetermined threshold, is effective for stably performing the cable-attachment diagnostic operation without a system suspension due to excessive load to electric motor 20a. (11) The steering control apparatus configured to set the second steering ratio setting so that the rotational speed of electric motor 20a is lower than or equal to a predetermined threshold, and to set the first steering ratio setting in accordance with the second steering ratio setting, is effective for making it unnecessary for the operator to care about the steering speed during the operation, and for reducing the time required for incorrect attachment detection.

Figure 31:
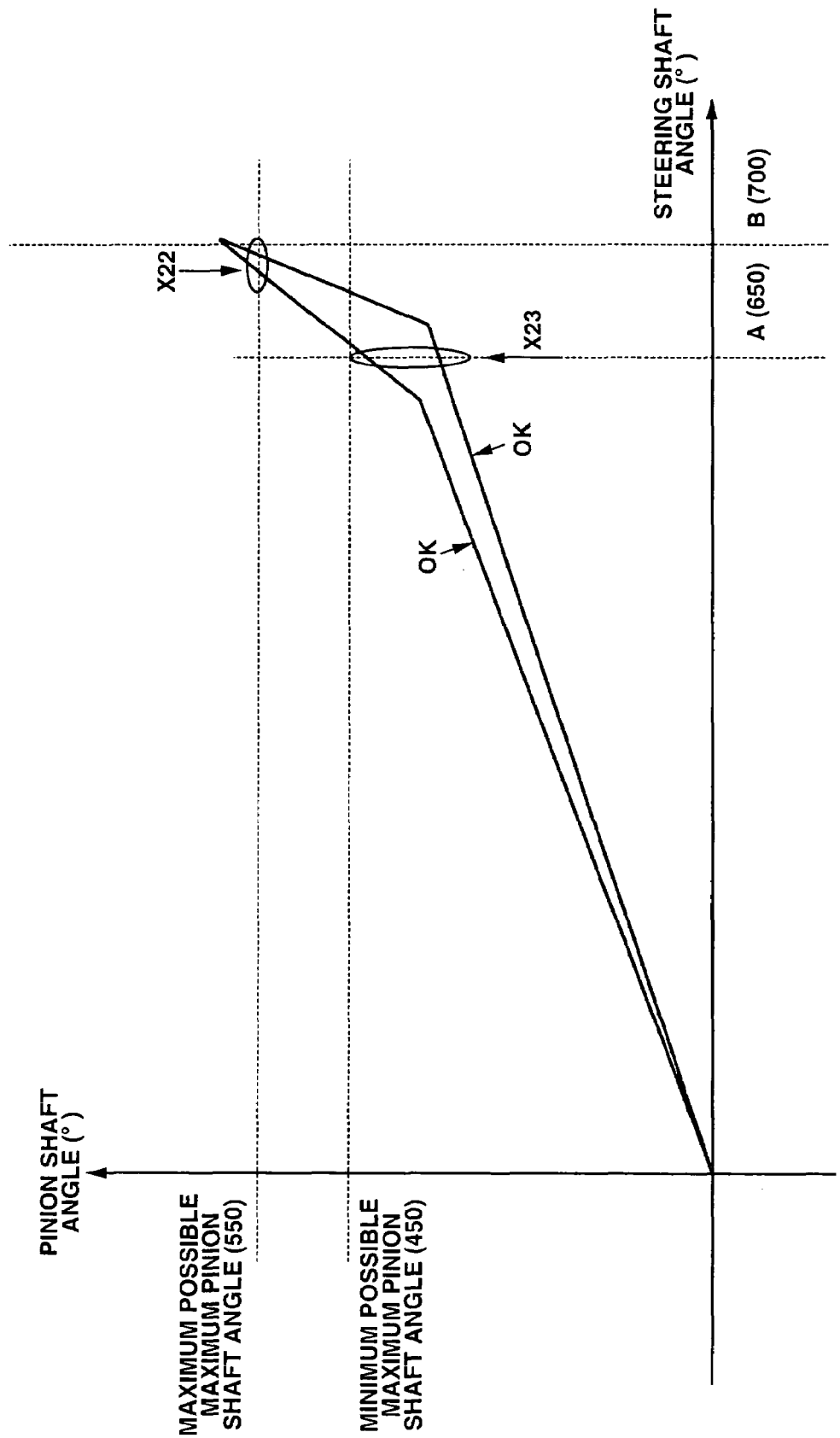
FIG. 31 is a view showing a relationship between steering shaft angle θ and pinion shaft angle δ when the switching point from the first steering ratio setting to the second steering ratio setting is set to a point where steering shaft angle θ is smaller or lager than A in accordance with a modified embodiment.
Figure 32:
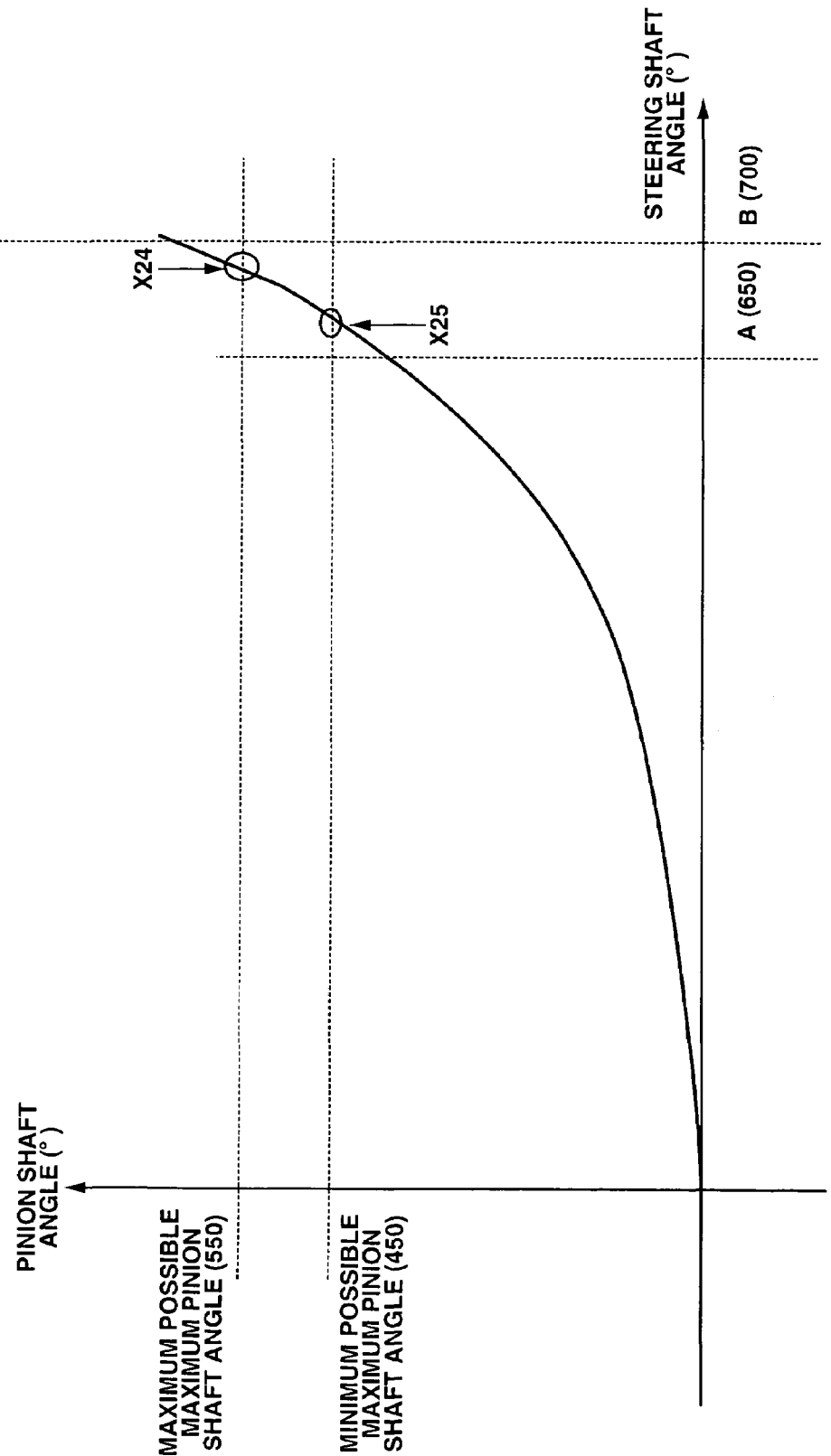
FIG. 32 is a view showing a relationship between steering shaft angle θ and pinion shaft angle δ when the steering ratio setting is continuously changed in such a manner as to satisfy the first and second conditions in accordance with a modified embodiment.

Referring now to FIGS. 31 and 32, there are shown other modifications of the shown embodiments. Although in the fifth, sixth, and seventh embodiments, the steering ratio is switched from the first steering ratio setting to the second steering ratio setting when steering shaft angle θ is maximum operating steering shaft angle A, the switching point may be moved from A as long as the necessary condition 1 is satisfied. FIG. 31 is a view showing a relationship between steering shaft angle θ and pinion shaft angle δ when the switching point from the first steering ratio setting to the second steering ratio setting is set to a point where steering shaft angle θ is smaller or lager than A in accordance with a modified embodiment. Thus, if the steering ratio is switched so that pinion shaft angle δ is smaller than or equal to minimum possible maximum pinion shaft angle δmin, the cable-attachment diagnostic operation is correctly performed without restriction by rack stoppers 50a, 50b, as shown in a region X23 in FIG. 31. On the other hand, if the steering ratio is controlled so that pinion shaft angle δ reaches maximum possible maximum pinion shaft angle before steering shaft angle θ reaches B, steering shaft angle θ is limited by rack stoppers 50a, 50b to prevent that the failure handling logic suspends the system or the airbag spiral cable is broken, as shown in a region X22 in FIG. 31. Thus, the switching point of the steering ratio may be properly set in consideration of the characteristic of electric motor 20a.

FIG. 32 is a view showing a relationship between steering shaft angle θ and pinion shaft angle δ when the steering ratio setting is continuously changed in such a manner as to satisfy the first and second conditions in accordance with a modified embodiment. As shown in FIG. 32, the steering ratio is controlled so that pinion shaft angle δ changes nonlinearly with steering shaft angle θ and so that conditions 1 and 2 are satisfied, as shown in regions X24 and X25.

Although the steering control apparatus of the present embodiments is applied to spiral cable 21a attached to variable steering ratio control mechanism 20, the steering control apparatus may be applied to a cable-attachment diagnostic for any other cable connected to a device rigidly rotating with steering wheel 1 or steering shaft 3. For example, the steering control apparatus may be applied to detecting attachment error of a spiral cable connected to an airbag mechanism rotating with steering shaft 3, to produce the same operation effects and advantages.

This application is based on a prior Japanese Patent Application No. 2004-343266 filed on Nov. 29, 2004, and a prior Japanese Patent Application No. 2005-273101 filed on Sep. 21, 2005. The entire contents of these Japanese Patent Applications Nos. 2004-343266 and 2005-273101 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A steering control apparatus for a vehicle including a steering input unit movable to set a steering input, and a steering output unit arranged to output a steering output, the steering input unit being connected via a cable to a body of the vehicle, the steering control apparatus comprising:
a steering ratio control unit configured to regulate a variable steering ratio as a rate of change in the steering output with respect to a change in the steering input;
a steering limiter configured to restrict movement of the steering input unit to limit the steering input; and
a cable-attachment diagnostic controller connected for signal communication with the steering ratio control unit, and configured to be activated in a cable-attachment diagnostic mode, to control the steering ratio such that the steering input unit is movable over an allowable region defined by the steering limiter when the cable is correctly attached.

2. The steering control apparatus as claimed in claim 1, further comprising a diagnostic operation activation unit connected for signal communication with the cable-attachment diagnostic controller, and configured to be responsive to an instruction of the cable-attachment diagnostic mode, to activate the cable-attachment diagnostic controller.

3. The steering control apparatus as claimed in claim 2, wherein the steering input unit includes a steering wheel, and a steering shaft coupled to the steering wheel, wherein the steering output unit includes a steerable road wheel, a pinion shaft, a steering gear mechanism connected between the steerable road wheel and the pinion shaft for motion conversion therebetween, wherein the steering ratio control unit is configured to regulate a variable shaft steering ratio as a rate of change in a rotation angle of the pinion shaft with respect to a change in a rotation angle of the steering shaft, and wherein the cable-attachment diagnostic controller is configured to control the shaft steering ratio to be lower than 1.

4. The steering control apparatus as claimed in claim 3, wherein the steering gear mechanism includes a rack shaft axially movable in accordance with an angular position of the pinion shaft, wherein the steering limiter includes a rack stopper arranged to mechanically restrict movement of the rack shaft, and wherein the cable-attachment diagnostic controller is configured to control the shaft steering ratio such that the rotation angle of the steering shaft reaches a maximum operating steering shaft angle for a usual driving condition of the vehicle when the rack shaft is in contact with the rack stopper.

5. The steering control apparatus as claimed in claim 2, wherein the cable-attachment diagnostic controller is configured to control the steering ratio such that an average steering ratio as a rate of the steering output with respect to the steering input is smaller than or equal to a minimum setting of a usual driving condition of the vehicle.

6. The steering control apparatus as claimed in claim 1, wherein the cable-attachment diagnostic controller is configured to move the steering input unit over the allowable region.

7. The steering control apparatus as claimed in claim 6, wherein the steering input unit includes a steering wheel, and a steering shaft coupled to the steering wheel, wherein the steering output unit includes a steerable road wheel, a pinion shaft, a steering gear mechanism connected between the steerable road wheel and the pinion shaft for motion conversion therebetween, wherein the steering ratio control unit is configured to regulate a variable shaft steering ratio as a rate of change in a rotation angle of the pinion shaft with respect to a change in a rotation angle of the steering shaft, and wherein the cable-attachment diagnostic controller is configured to control the shaft steering ratio to be lower than 1.

8. The steering control apparatus as claimed in claim 1, wherein the cable-attachment diagnostic controller is configured to control the steering ratio with a first steering ratio setting such that the steering output is smaller than or equal to a minimum possible value of a maximum setting of the steering output when the steering input is a maximum operating steering input for a usual driving condition of the vehicle, before the steering input reaches the maximum operating steering input, and that the steering input is limited by the steering limiter after the steering input exceeds the maximum operating steering input.

9. The steering control apparatus as claimed in claim 8, wherein the cable-attachment diagnostic controller is configured to control the steering ratio such that the steering input is limited by the steering limiter when the steering input is larger than the maximum operating steering input and is smaller than a maximum allowable steering input.

10. The steering control apparatus as claimed in claim 8, wherein the cable-attachment diagnostic controller is configured to control the steering ratio such that the steering output reaches a maximum possible value of the mechanically defined maximum setting of the steering output before the steering input reaches a maximum allowable steering input.

11. The steering control apparatus as claimed in claim 8, wherein the steering output unit includes a member movable in accordance with the steering output, wherein the steering limiter includes a stopper arranged to mechanically restrict movement of the movable member of the steering output unit, and wherein the cable-attachment diagnostic controller is configured to control the steering ratio with a second steering ratio setting such that the steering output reaches a maximum possible value of the maximum setting of the steering output before the steering input reaches a maximum allowable steering input, after the steering input exceeds the maximum operating steering input with the first steering ratio setting.

12. The steering control apparatus as claimed in claim 11, wherein the cable-attachment diagnostic controller is configured to control the steering ratio such that a rate of change in the steering ratio in transition from the first steering ratio setting to the second steering ratio setting is lower than or equal to a predetermined threshold.

13. The steering control apparatus as claimed in claim 11, wherein the cable-attachment diagnostic controller is configured to set the second steering ratio setting such that a load of the steering ratio control unit is lower than or equal to a predetermined threshold, and to set the first steering ratio setting in accordance with the second steering ratio setting.

14. The steering control apparatus as claimed in claim 1, wherein the steering limiter includes a steering input sensor configured to measure the steering input within a maximum measurable steering input, and wherein the steering limiter is configured to limit the steering input within a value between a maximum operating steering input for a usual driving condition of the vehicle and the maximum measurable steering input.

15. The steering control apparatus as claimed in claim 14, wherein the steering limiter includes an annunciator configured to be activated during the steering input being between the maximum operating steering input and the maximum measurable steering input, to limit the steering input.

16. The steering control apparatus as claimed in claim 1, wherein the steering output unit includes a member movable in accordance with the steering output, wherein the steering limiter includes a stopper arranged to mechanically restrict movement of the movable member of the steering output unit, and wherein the cable-attachment diagnostic controller is configured to control the steering ratio such that the steering input reaches a maximum operating steering input for a usual driving condition of the vehicle when the steering output reaches a mechanically-restricted maximum steering output.

17. The steering control apparatus as claimed in claim 1, further comprising an electric power steering unit configured to boost a driver's steering effort, wherein the cable-attachment diagnostic controller is configured to operate the electric power steering unit to move the steering input unit over the allowable region.

18. The steering control apparatus as claimed in claim 1, wherein the steering ratio control unit includes an electric actuator connected for rotation therewith to the steering input unit, and connected electrically via the cable to the vehicle body.

19. The steering control apparatus as claimed in claim 1, wherein the cable is an airbag cable connected electrically between the steering input unit and via the cable to the vehicle body.

20. A steering control apparatus for a vehicle including a steering input unit movable to set a steering input, and a steering output unit arranged to output a steering output, the steering input unit being connected via a cable to a body of the vehicle, the steering control apparatus comprising:

steering ratio control means for regulating a variable steering ratio as a rate of change in the steering output with respect to a change in the steering input;

steering limiting means for restricting movement of the steering input unit to limit the steering input; and cable-attachment diagnostic control means for activating a cable-attachment diagnostic mode, to control the steering ratio such that the steering input unit is movable over an allowable region defined by the steering limiting means when the cable is correctly attached.

* * * * *